United States Patent
Yamashita et al.

(10) Patent No.: US 11,336,145 B2
(45) Date of Patent: May 17, 2022

(54) MOTOR

(71) Applicant: Nidec Corporation, Kyoto (JP)

(72) Inventors: Yoshiaki Yamashita, Kyoto (JP);
Shunsuke Murakami, Kyoto (JP);
Kosuke Ogawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 319 days.

(21) Appl. No.: 16/497,633

(22) PCT Filed: Mar. 30, 2018

(86) PCT No.: PCT/JP2018/013694
§ 371 (c)(1),
(2) Date: Sep. 25, 2019

(87) PCT Pub. No.: WO2018/181927
PCT Pub. Date: Oct. 4, 2018

(65) Prior Publication Data
US 2020/0059129 A1 Feb. 20, 2020

Related U.S. Application Data

(60) Provisional application No. 62/479,488, filed on Mar. 31, 2017, provisional application No. 62/479,490, filed on Mar. 31, 2017.

(30) Foreign Application Priority Data

Sep. 29, 2017 (JP) .............................. JP2017-191093
Sep. 29, 2017 (JP) .............................. JP2017-191095
Sep. 29, 2017 (JP) .............................. JP2017-191096

(51) Int. Cl.
*H02K 3/52* (2006.01)
*H02K 3/18* (2006.01)
*H02K 15/095* (2006.01)

(52) U.S. Cl.
CPC ............... *H02K 3/522* (2013.01); *H02K 3/18* (2013.01); *H02K 15/095* (2013.01)

(58) Field of Classification Search
CPC ............ H02K 3/46; H02K 3/18; H02K 3/522; H02K 15/095; H02K 3/50; H02K 3/52; H02K 3/521

(Continued)

(56) References Cited

U.S. PATENT DOCUMENTS 6,470,984 B1 * 10/2002 Nakajima ............... B60K 6/485
180/65.26
6,914,356 B2 * 7/2005 Yamamura ............. H02K 3/522
310/71

(Continued)

FOREIGN PATENT DOCUMENTS

CN 105743288 A 7/2016
JP 2009-247039 A 10/2009

(Continued)

OTHER PUBLICATIONS

Official Communication issued in corresponding Chinese Patent Application No. 201880028359.6, dated Sep. 2, 2021.

(Continued)

*Primary Examiner* — Burton S Mullins
(74) *Attorney, Agent, or Firm* — Keating & Bennett

(57) ABSTRACT

A motor includes a rotor, a stator, and first bus bars electrically connected to the stator on one axial direction side of the stator. The stator includes a stator core including a core back extending in a circumferential direction, teeth extending radially from the core back, and coils defined by winding a conducting wire, each of which is mounted on the teeth. A first conducting wire and a second conducting wire which are two respective ends of the conducting wire extend to one axial direction side from each of the coils. The first bus bars (Continued)

are neutral point bus bars connecting two or more first conducting wires as neutral points. The second conducting wire is connected to a power supply that supplies power to the stator.

13 Claims, 11 Drawing Sheets

(58) Field of Classification Search
USPC .......................................................... 310/71
See application file for complete search history.

(56) References Cited

U.S. PATENT DOCUMENTS

| | | | |
|---|---|---|---|
| 7,193,345 B2* | 3/2007 | Shinzaki | H02K 3/522 310/179 |
| 7,518,853 B2* | 4/2009 | Kato | H02K 3/522 310/68 R |
| 8,350,436 B2* | 1/2013 | Sakane | H02K 3/522 310/194 |
| 8,497,618 B2* | 7/2013 | Kato | H02K 3/522 310/215 |
| 9,467,018 B2* | 10/2016 | Kitta | H02K 3/522 |
| 10,050,483 B2 | 8/2018 | Sambuichi et al. | |
| 10,566,870 B2 | 2/2020 | Sambuichi et al. | |
| 10,566,871 B2 | 2/2020 | Sambuichi et al. | |
| 10,615,656 B2* | 4/2020 | Haga | H02K 3/28 |
| 2005/0012413 A1* | 1/2005 | Bott | H02K 3/522 310/71 |
| 2010/0133935 A1 | 6/2010 | Kinugawa et al. | |
| 2010/0327680 A1 | 12/2010 | Miyachi et al. | |
| 2016/0218578 A1* | 7/2016 | Yamada | H02K 15/0068 |

FOREIGN PATENT DOCUMENTS

| | | |
|---|---|---|
| JP | 2015-154708 A | 8/2015 |
| JP | 2016-013053 A | 1/2016 |
| JP | 2016-072997 A | 5/2016 |
| JP | 2016-174527 A | 9/2016 |

OTHER PUBLICATIONS

Official Communication issued in International Patent Application No. PCT/JP2018/013694, dated Jun. 19, 2018.

* cited by examiner

MOTOR

CROSS REFERENCE TO RELATED APPLICATION

This is a U.S. national stage of PCT Application No. PCT/JP2018/013694, filed on Mar. 30, 2018, and priority under 35 U.S.C. § 119(a) and 35 U.S.C. § 365(b) is claimed from US Provisional Patent Application No. 62/479,488, filed on Mar. 31, 2017, US Provisional Patent Application No. 62/479,490, filed Mar. 31, 2017, Japanese Patent Application No. 2017-191093, filed on Sep. 29, 2017, Japanese Patent Application No. 2017-191095 filed on Sep. 29, 2017, and Japanese Patent Application No. 2017-191096 filed on Sep. 29, 2017, the entire contents of each application are hereby incorporated herein by reference.

FIELD OF THE INVENTION

The present disclosure relates to a motor.

BACKGROUND

A motor is known in which a plurality of windings is connected via a connecting wire. For example, JP 2011-30406 A describes a motor provided with a three-phase winding group.

In the motor as described above, it is necessary to form a plurality of windings and connecting wires connecting the windings from one conducting wire, which may take time and effort to manufacture the motor. On the other hand, for example, a configuration is conceivable in which two conducting wires are drawn from each of the windings and each of the drawn conducting wires is connected to a bus bar or the like.

However, in this case, since two conducting wires are drawn from one winding, the distance between the conducting wires drawn from the windings tends to be shorter than when the connecting wire is provided. Therefore, there is a possibility that the drawn conducting wires may come in contact with each other to cause a short circuit. When a short circuit occurs between the windings, current may not flow normally to the windings, and torque generated in the direction to inhibit the rotation of the rotor may increase. Therefore, the efficiency of the motor may be reduced.

SUMMARY

One example embodiment of a motor of the present disclosure includes a rotor including a shaft disposed along a center axis, a stator facing the rotor via a clearance in a radial direction, and a plurality of first bus bars electrically connected to the stator on one axial direction side of the stator. The stator includes a stator core including a circumferentially extending core back and a plurality of teeth radially extending from the core back, and a plurality of coils that is defined by a wound conducting wire and each of which is mounted on the plurality of teeth. A first conducting wire and a second conducting wire which are both respective ends of the conducting wire extend to one axial direction side from each of the plurality of coils. The plurality of first bus bars is neutral point bus bars connecting two or more of the first conducting wires as neutral points. The second conducting wire is connected to a power supply that supplies power to the stator. In each of the coils, the first conducting wire and the second conducting wire are located on both respective sides of the teeth in the circumferential direction when viewed along the axial direction. The first conducting wire is located on one radial direction side relative to a radial center of the coil. The second conducting wire is located on another radial direction side to the radial center of the coil.

According to example embodiments of the present disclosure, it is possible to prevent a short circuit between coils in a motor while reducing the time and effort required to manufacture the motor.

The above and other elements, features, steps, characteristics and advantages of the present disclosure will become more apparent from the following detailed description of the example embodiments with reference to the attached drawings.

DETAILED DESCRIPTION

The Z-axis direction appropriately shown in each figure is a vertical direction with the positive side as the upper side and the negative side as the lower side. The center axis J appropriately shown in each figure is parallel to the Z-axis direction, and a virtual line extending in the vertical direction. In the following description, the axial direction of the center axis J, that is, the direction parallel to the vertical direction is simply referred to as "axial direction", the radial direction centered on the center axis J is simply referred to as "radial direction", and the circumferential direction about the center axis J is simply referred to as "circumferential direction". In each figure, the circumferential direction is appropriately indicated by an arrow θ. In the present example embodiment, the radially outer side corresponds to one radial direction side, and the radially inner side corresponds to the other radial direction side.

Moreover, the positive side in the Z-axis direction in the axial direction is referred to as "upper side", and the negative side in the Z-axis direction in the axial direction is referred to as "lower side". In the present example embodiment, the upper side corresponds to one axial direction side. Further, the side toward the counterclockwise direction as viewed from the upper side to the lower side in the circumferential direction, that is, the side toward the direction of the arrow θ is referred to as "one circumferential direction side". The side toward the clockwise direction as viewed from the upper side to the lower side in the circumferential direction, that is, the side toward the direction opposite to the direction of the arrow θ is referred to as "the other circumferential direction side".

Note that the up-down direction, the upper side, and the lower side are names for merely describing the relationships between relative positions of each portion. The actual arrangement relationships or the like may be, for example, arrangement relationships other than, for example, the arrangement relationships indicated by these names.

Figure 1:
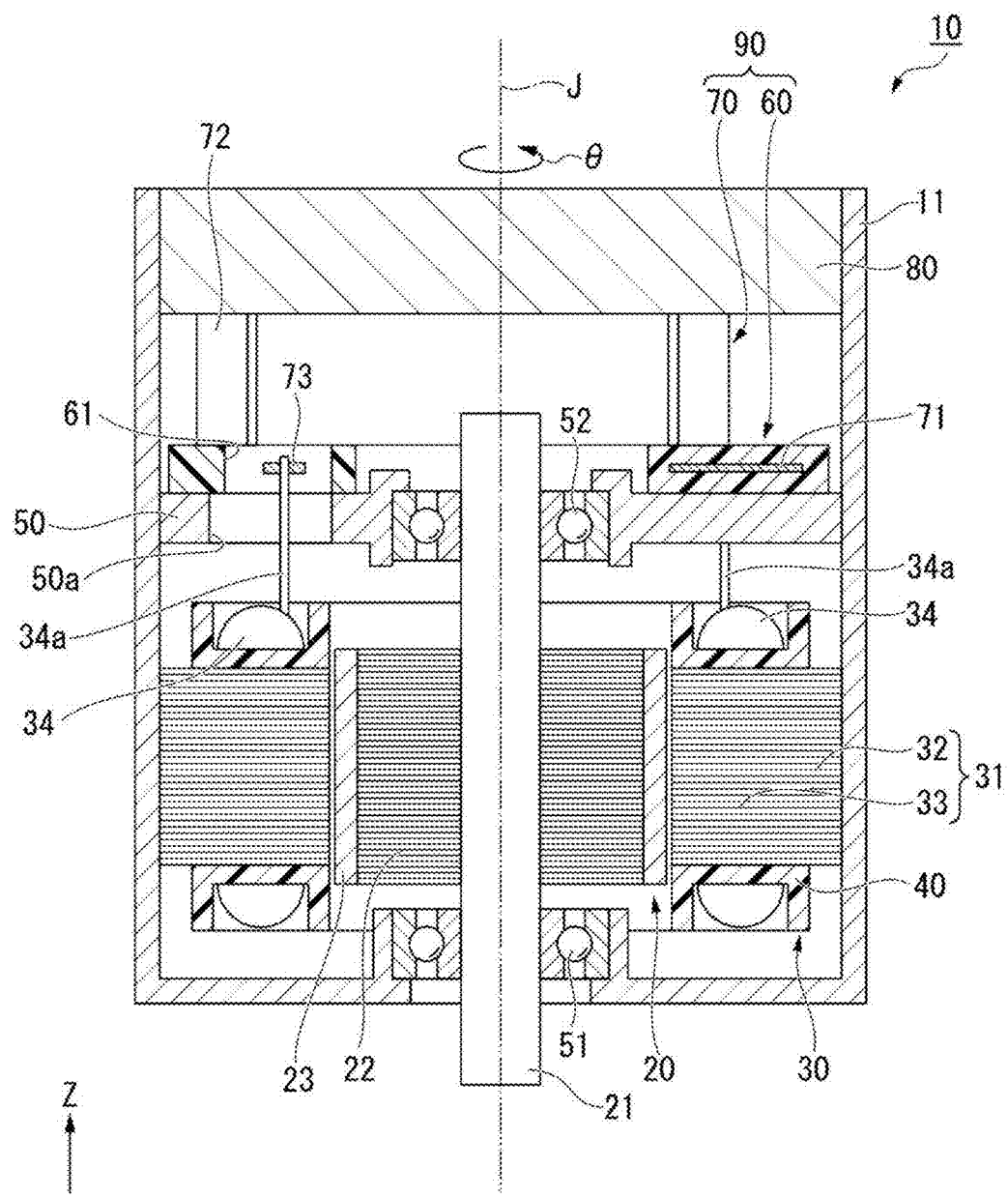
FIG. 1 is a cross-sectional view showing a motor of an example embodiment of the present disclosure.
Figure 2:
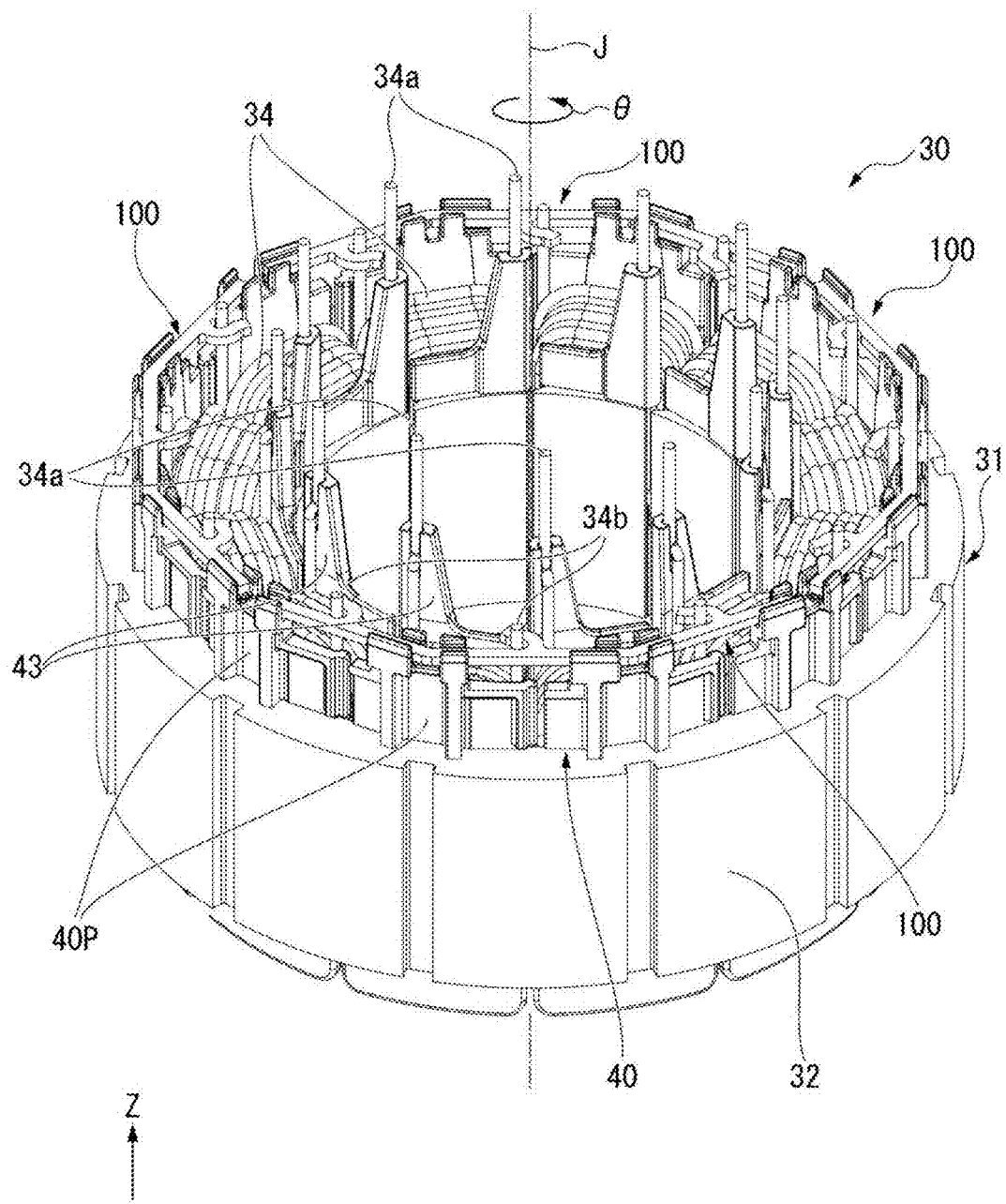
FIG. 2 is a perspective view showing a stator and a first bus bar of an example embodiment of the present disclosure.

As shown in FIGS. 1 and 2, a motor 10 of the present example embodiment includes a housing 11, a rotor 20, bearings 51 and 52, a stator 30, a plurality of first bus bars 100, a bearing holder 50, a bus bar unit 90, and a control device 80. In the present example embodiment, four first bus bars 100 are provided. The bus bar unit 90 includes a bus bar holder 60 and a plurality of second bus bars 70. That is, the motor 10 includes the bus bar holder 60 and the plurality of second bus bars 70. In the present example embodiment, three second bus bars 70 are provided. As shown in FIG. 1, the housing 11 accommodates each part of the motor 10. The housing 11 is cylindrical around the center axis J. The housing 11 holds a bearing 51 at the bottom on the lower side.

The rotor 20 includes a shaft 21, a rotor core 22, and a magnet 23. The shaft 21 is disposed along the center axis J. The shaft 21 is rotatably supported by the bearings 51 and 52. The rotor core 22 has an annular shape fixed to the outer peripheral face of the shaft 21. The magnet 23 is fixed to the outer peripheral face of the rotor core 22. The bearing 51 rotatably supports the shaft 21 on the lower side of the rotor core 22. The bearing 52 rotatably supports the shaft 21 on the upper side of the rotor core 22. The bearings 51 and 52 are ball bearings.

The stator 30 faces the rotor 20 in the radial direction via a clearance. The stator 30 surrounds the rotor 20 at the radially outer side of the rotor 20. The stator 30 includes a stator core 31, a plurality of coils 34, and an insulator 40. That is, the motor 10 includes the stator core 31, the plurality of coils 34, and the insulator 40. In addition, in FIG. 1, the insulator 40 is simplified and shown. The stator core 31 includes a core back 32 and a plurality of teeth 33. As shown in FIG. 2, the core back 32 extends in the circumferential direction. More specifically, the core back 32 is cylindrical around the center axis J.

Figure 3:
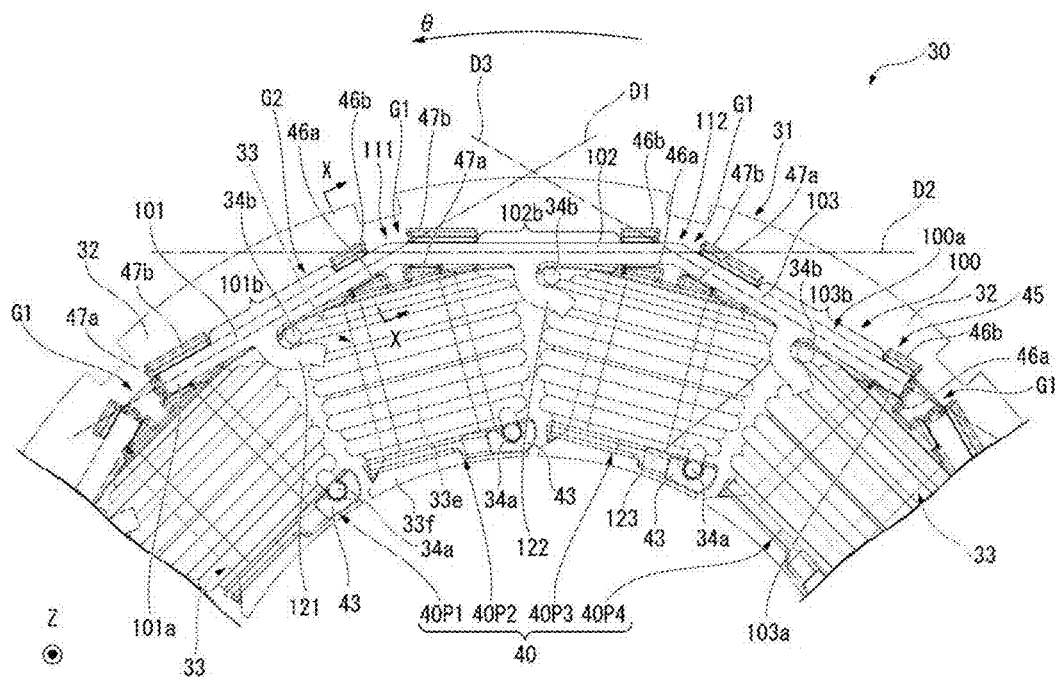
FIG. 3 is a view of a portion of a stator and a first bus bar of an example embodiment of the present disclosure as viewed from the upper side.

As shown in FIG. 3, the plurality of teeth 33 extends in the radial direction from the core back 32. More specifically, the plurality of teeth 33 extends radially inward from the radially inner face of the core back 32. The plurality of teeth 33 is arranged at equal intervals along the circumferential direction over a whole circumference. For example, twelve teeth 33 are provided.

The tooth 33 has a tooth body 33e and an umbrella portion 33f. The tooth body 33e is a portion that extends radially inward from the radially inner face of the core back 32. The umbrella portion 33f is connected to the radially inner end of the tooth body 33e. The umbrella portion 33f protrudes to two sides in the circumferential direction relative to the tooth body 33e.

The plurality of coils 34 is mounted to the plurality of teeth 33 via the insulator 40. The coil 34 is defined by a wound conducting wire around the teeth 33 through the insulator 40. For example, twelve coils 34 are provided.

Figure 4:
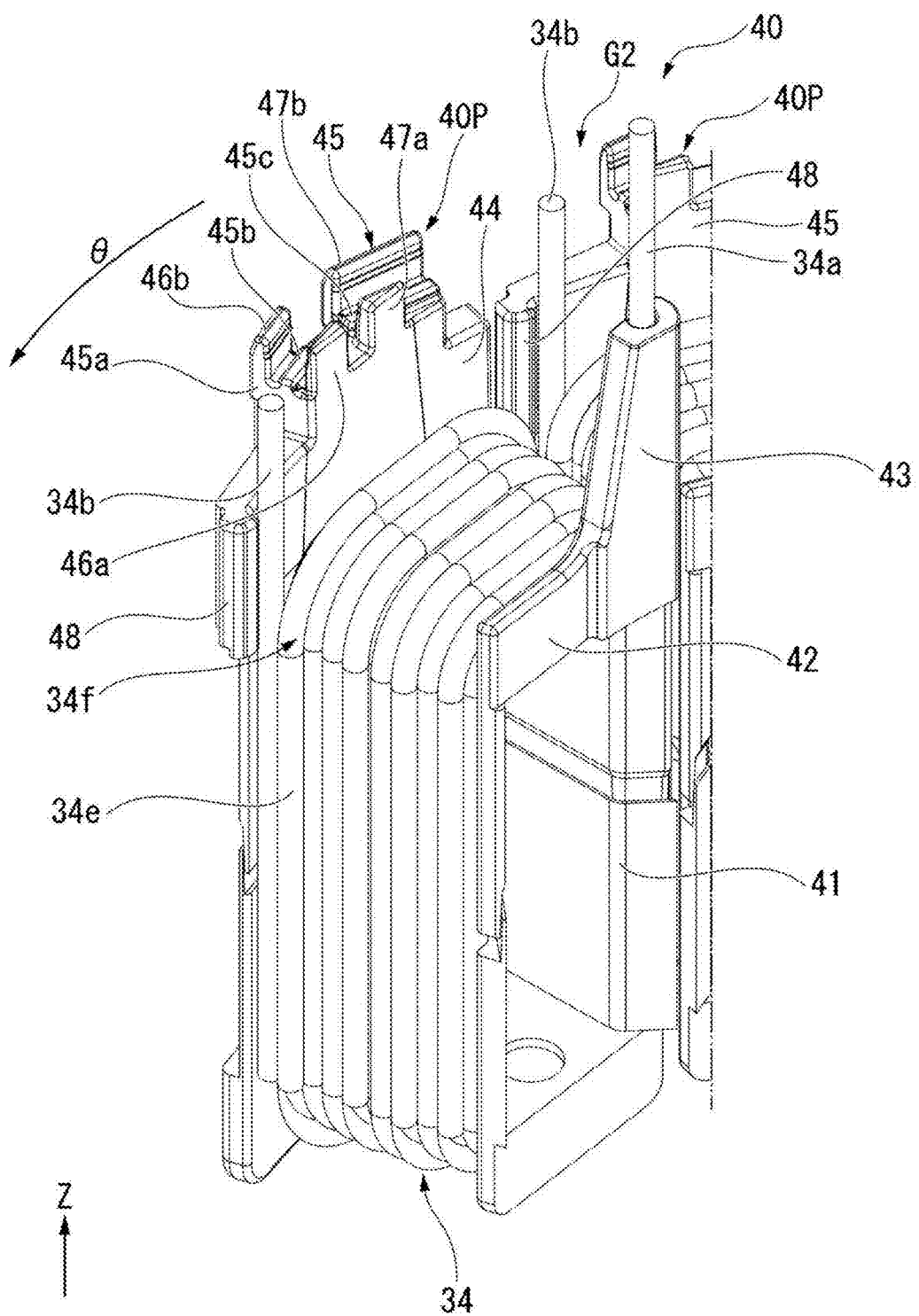
FIG. 4 is a perspective view showing an insulator piece of an example embodiment of the present disclosure.

As shown in FIG. 4, in the present example embodiment, the coil 34 is defined by winding a conducting wire in a rectangular frame shape with rounded corner portions. The outer diameter of the coil 34 is the largest at an outermost peripheral conducting wire 34e wound around the outermost periphery of the conducting wire constituting the coil 34. The outermost peripheral conducting wire 34e is a portion of the coil 34 located radially outward. The outermost peripheral conducting wire 34e is disposed radially inside relative to the radially outer end of the coil 34. The outermost peripheral conducting wire 34e has a shape of a rectangular frame with rounded corner portions.

From each coil 34, coil leads 34a and 34b are drawn upward. The coil leads 34a and 34b are conducting wires extending upward from the coil 34 and are ends of the conducting wire constituting the coil 34. That is, the coil lead 34a and the coil lead 34b, which are both ends of the conducting wire constituting each coil 34, extend upward from each of the plurality of coils 34. The coil lead 34a is an end on the winding start side of the conducting wire constituting the coil 34. The coil lead 34b is an end on the winding end side of the conducting wire constituting the coil 34. The coil lead 34a is electrically connected to the second bus bar 70. The coil lead 34b is electrically connected to the first bus bar 100. In the present example embodiment, the coil lead 34a corresponds to a second conducting wire, and the coil lead 34b corresponds to a first conducting wire.

As shown in FIG. 3, in each coil 34, the coil lead 34a and the coil lead 34b are located on two sides in the circumferential direction of the teeth 33 as viewed along the axial direction. In the present example embodiment, each coil lead 34a is located on the same side in the circumferential direction with respect to the respective teeth 33 as viewed along the axial direction. Each coil lead 34b is located on the same side in the circumferential direction with respect to the respective teeth 33 as viewed along the axial direction. The coil lead 34a is located on the other circumferential direction side of the teeth 33 as viewed along the axial direction. The coil lead 34b is located on the one circumferential direction side of the teeth 33 as viewed along the axial direction.

In each coil 34, the coil lead 34a is located radially inside relative to the radial center of the coil 34. In each coil 34, the coil lead 34b is located radially outside relative to the radial center of the coil 34. That is, in the present example embodiment, the respective coil leads 34a are located on the same side in the radial direction relative to the radial centers of each coil 34. The respective coil leads 34b are located on the same side in the radial direction relative to the radial center of each coil 34.

In the present example embodiment, the coil lead 34a extends upward from the radially inner end of the coil 34. In the present example embodiment, the coil lead 34b extends upward from the radially outer end of the coil 34. In each coil 34 of the present example embodiment, the coil lead 34a and the coil lead 34b are arranged in substantially point symmetry with respect to a center point of the coil 34 which is circumferentially and radially centered when viewed along the axial direction.

Figure 5:
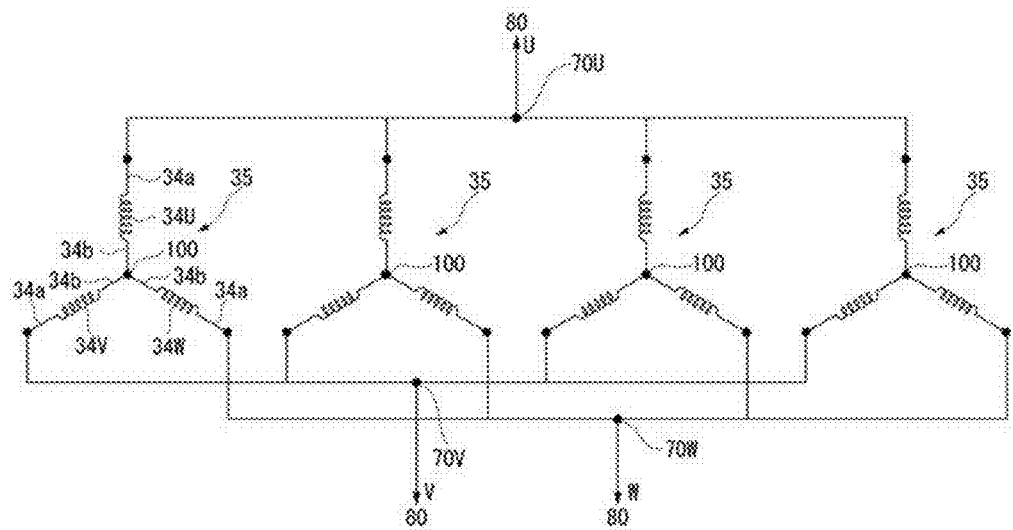
FIG. 5 is a schematic view showing a circuit defined by a coil of the present example embodiment of the present disclosure.

As shown in FIG. 5, in the present example embodiment, a plurality of coil groups 35 each including a plurality of coils 34 is configured. In the present example embodiment, four coil groups 35 are provided. Each coil group 35 includes, as three coils 34, a coil 34U, a coil 34V, and a coil 34W. The coils 34U, 34V, and 34W of each coil group 35 are connected by star connection.

In each coil group 35, the coil lead 34*b* of the coil 34U, the coil lead 34*b* of the coil 34V, and the coil lead 34*b* of the coil 34W are connected to the first bus bar 100. The respective first bus bars 100 to which each coil group 35 is connected are different from one another. That is, in the present example embodiment, three coil leads 34*b* are connected to each of the plurality of first bus bars 100. The plurality of first bus bars 100 is neutral point bus bars connecting two or more coil leads 34*b* as neutral points.

The coil lead 34*a* of the coil 34U in each coil group 35 is connected to the second bus bar 70U among the plurality of second bus bars 70. The coil lead 34*a* of the coil 34V in each coil group 35 is connected to the second bus bar 70V among the plurality of second bus bars 70. The coil lead 34*a* of the coil 34W in each coil group 35 is connected to the second bus bar 70W among the plurality of second bus bars 70. That is, in the present example embodiment, the four coil leads 34*a* are connected to each of the second bus bars 70U, 70V and 70W, which are the three second bus bars 70. Each coil lead 34*a* is connected to the control device 80 via each of the second bus bars 70U, 70V and 70W. Therefore, it is easy to connect the coil lead 34*a* to the control device 80. In the present example embodiment, the control device 80 is a power supply that supplies power to the stator 30.

A U phase alternating current is supplied from the control device 80 to the coil lead 34*a* of each coil 34U via the second bus bar 70U. A V phase alternating current is supplied from the control device 80 to the coil lead 34*a* of each coil 34V via the second bus bar 70V. A W phase alternating current is supplied from the control device 80 to the coil lead 34*a* of each coil 34W via the second bus bar 70W. As described above, the motor 10 according to the present example embodiment is a three-phase motor to which U phase, V phase, and W phase alternating currents are supplied.

As described above, according to the present example embodiment, the coil leads 34*a* and 34*b*, which are both ends of the conducting wire that constitutes the coil 34, extend from each of the coils 34. Therefore, each coil 34 is formed of a single conducting wire, and a connecting wire connecting the coils 34 is not provided. Thereby, each coil 34 can be easily made. Further, since it is not necessary to extend the connecting wire, the arrangement of the plurality of coils 34 can be facilitated. Moreover, it is not necessary to provide an insulating tube, etc. which insulate the connecting wire. Therefore, the labor for manufacturing the motor can be reduced. In addition, since the connecting wire is not provided, it is easy to make the path length along which a current flows from each of the second bus bars 70U, 70V and 70W to the respective coils 34 constant. As a result, the magnetic field generated in each coil 34 can be easily made constant accurately, and the magnetic characteristics of the motor 10 can be improved.

In addition, the coil lead 34*a* and the coil lead 34*b* are located on two sides in the circumferential direction of the teeth 33 as viewed along the axial direction. The coil lead 34*a* is located radially inside relative to the radial center of the coil 34, and the coil lead 34*b* is located radially outside relative to the radial center of the coil 34. Therefore, the coil lead 34*a* and the coil lead 34*b* can be disposed apart from each other in the circumferential direction and the radial direction. As a result, even when the coil lead 34*a* and the coil lead 34*b* extend upward from each of the coils 34, it is possible to suppress the problem that the coil lead 34*a* and the coil lead 34*b* contact each other to cause a short circuit. Therefore, it is possible to suppress the problem that the current does not normally flow to the coil 34, and it is possible to suppress the problem that the torque generated in the direction to inhibit the rotation of the rotor 20 increases. Therefore, it is possible to suppress the reduction in the efficiency of the motor 10.

As described above, according to the present example embodiment, it is possible to prevent the occurrence of a short circuit between the coils 34 while reducing the labor of manufacturing the motor 10. In the following description, the torque generated in a direction against the rotation of the rotor 20 will be referred to as a "brake torque".

Further, when the coil lead 34*a* connected to the control device 80 which is a power supply, and the coil lead 34*b* connected to the first bus bar 100 which is a neutral point bus bar contact each other to cause a short circuit, the brake torque is likely to increase, compared to the case of another short circuit. Therefore, according to the present example embodiment, it is possible to suppress the increase in the brake torque more suitably. In addition, the case of the other short circuit is, for example, a case where the coil leads 34*a* contact each other to cause a short circuit.

Further, according to the present example embodiment, the coil lead 34*a* extends from the radially inner end of the coil 34, and the coil lead 34*b* extends from the radially outer end of the coil 34. Therefore, the coil lead 34*a* and the coil lead 34*b* can be further spaced apart in the radial direction. Thereby, it is possible to further suppress the problem that the coil lead 34*a* and the coil lead 34*b* contact each other to cause a short circuit.

Also, according to the present example embodiment, each of the coil leads 34*a* is located on the same side in the circumferential direction with respect to the respective teeth 33 and, is located on the same side in the radial direction relative to the radial center of the coil 34, as viewed along the axial direction. Therefore, in the coils 34 adjacent to each other in the circumferential direction, the coil leads 34*a* can be spaced apart in the circumferential direction. Thereby, it is possible to suppress the problem that the coil leads 34*a* of the coils 34 adjacent to each other in the circumferential direction contact each other to cause a short circuit. Therefore, it is possible to further suppress the reduction in the efficiency of the motor 10. Also, when the coil lead 34*a* are arranged in this way, the coil leads 34*b* are located on the same side in the circumferential direction with respect to the respective teeth 33 and, is located on the same side in the radial direction relative to the radial center of the coil 34, as viewed along the axial direction. Thereby, it is possible to suppress the problem that the coil leads 34*b* of the coils 34 adjacent to each other in the circumferential direction contact each other to cause a short circuit. Therefore, it is possible to further suppress the reduction in the efficiency of the motor 10.

Also it is assumed that, for example, only one neutral point bus bar is provided and respective neutral points in the coil groups are connected to the one neutral point bus bar. In this case, even when a short circuit occurs in one coil group, all other coil groups are connected to each other via the one neutral point bus bar, so that the current may not flow normally to the coil of the other coil groups. Therefore, the brake torque is more likely to increase when a short circuit occurs.

On the other hand, according to this example embodiment, a plurality of first bus bars 100 which is the neutral point bus bars connecting two or more coil leads 34*b* as the neutral point is provided. Thereby, the connection of the neutral points in the plurality of coil groups 35 can be divided into the plurality of first bus bars 100. Therefore, at least two coil groups 35 can be provided that are not connected to each other via the first bus bar 100. Therefore, when a short circuit occurs in one coil group 35, it is possible to suppress the problem that the current does not flow normally to the coils 34 of the other coil groups 35. As a result, even when a short circuit occurs, the amount of increase in brake torque can be reduced.

In the present example embodiment, the motor 10 is a three-phase motor, and three coil leads 34b are connected to each of the first bus bars 100. Therefore, the neutral point of each coil group 35 can be connected to another first bus bar 100. As a result, the respective coil groups 35 are not connected to each other through the first bus bar 100, and the short circuit generated in one coil group 35 does not affect the current flowing to the other coil groups 35. Therefore, even when a short circuit occurs, the amount of increase in brake torque can be further reduced.

As shown in FIGS. 2 and 3, the insulator 40 is mounted on the stator core 31. In the present example embodiment, the insulator 40 is a holding member that holds the first bus bar 100. The insulator 40 has a plurality of insulator pieces 40P. The plurality of insulator pieces 40P is disposed along the circumferential direction and mounted to each of the teeth 33. In the present example embodiment, the plurality of insulator pieces 40P is members separate from one another. The shapes of the plurality of insulator pieces 40P is the same as one another. As shown in FIG. 4, the insulator pieces 40P are constituted, for example, by axially connecting two separate members.

The insulator piece 40P includes a tube portion 41, an inner protruding portion 42, a conducting wire holding portion 43, an outer protruding portion 44, a bus bar holding portion 45, and a pressing portion 48. That is, the insulator 40 includes the tube portion 41, the inner protruding portion 42, the conducting wire holding portion 43, the outer protruding portion 44, the bus bar holding portion 45, and the pressing portion 48.

Figure 6:
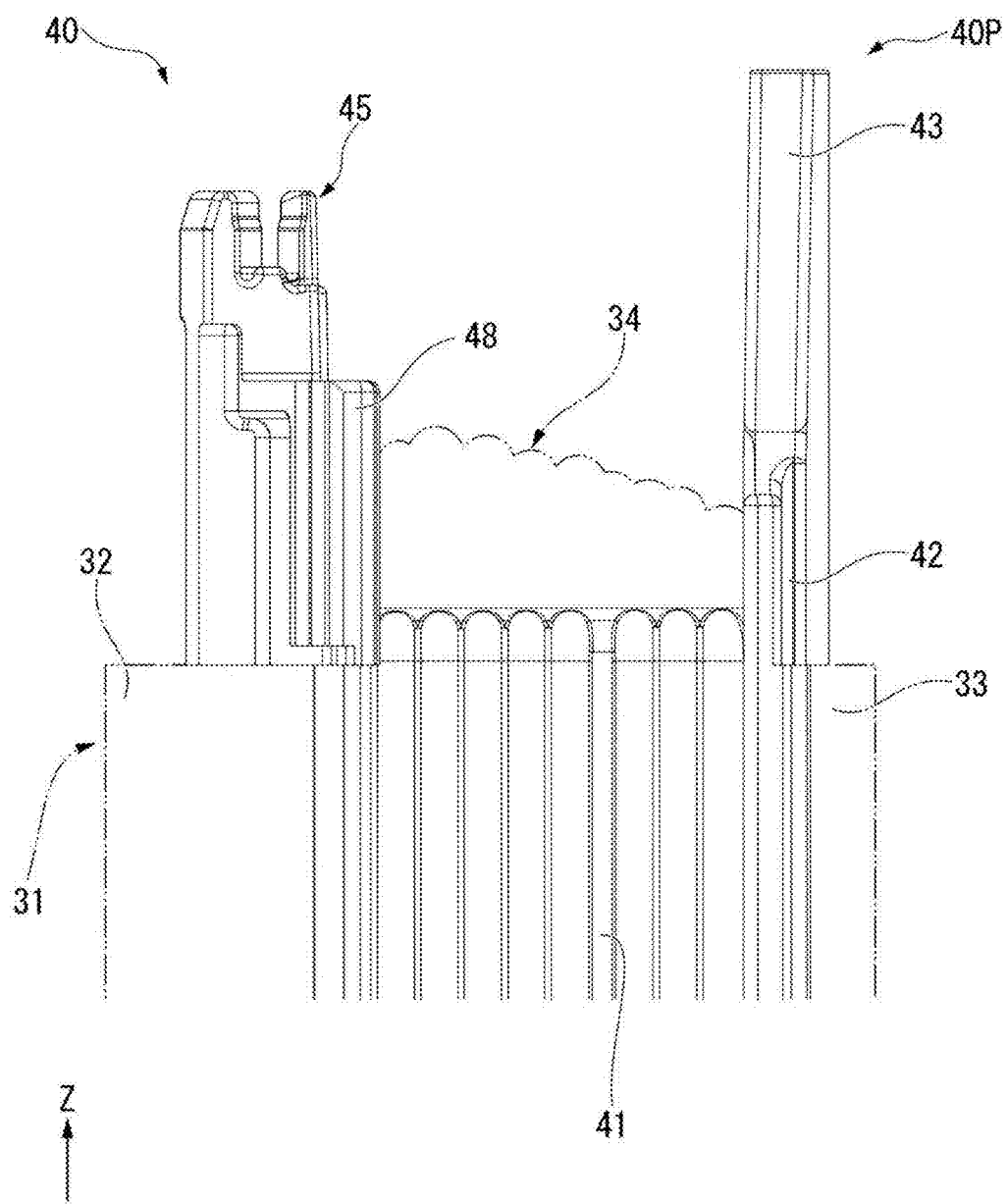
FIG. 6 is a view of a portion of an insulator piece of an example embodiment of the present disclosure as viewed from the one circumferential direction side.

The tube portion 41 has a cylindrical shape extending in the radial direction. In more detail, the tube portion 41 has a rectangular cylinder shape. As shown in FIG. 6, the teeth 33 passes through the tube portion 41. The tooth body 33e is inserted into the tube portion 41. The coil 34 is wound around the outer periphery of the tube portion 41. Thereby, the coil 34 is mounted to the tube portion 41. As shown in FIG. 4, the inner protruding portion 42 protrudes upward from the upper edge portion of the radially inner end of the tube portion 41. The inner protruding portion 42 is disposed on the upper side of the umbrella portion 33f. The tube portion 41 may not cover part of the outer peripheral face of the teeth 33. In this case, for example, a clearance may be provided between two separate members constituting the insulator pieces 40P, and the outer peripheral face of the teeth 33 may be exposed to outside of the tube portion 41 through the clearance.

The conducting wire holding portion 43 extends upward from a portion of the inner protruding portion 42 on the other circumferential direction side. In the present example embodiment, the conducting wire holding portion 43 extends upward from an end of the inner protruding portion 42 on the other circumferential direction side. As a result, the conducting wire holding portion 43 is connected to the radially inner end of the tube portion 41 via the inner protruding portion 42 and protrudes upward beyond the tube portion 41. The conducting wire holding portion 43 has a substantially quadrangular prism shape. The dimension of the conducting wire holding portion 43 in the circumferential direction decreases as it goes from the lower side to the upper side. The conducting wire holding portion 43 may extend upward from a portion of the inner protruding portion 42 on one circumferential direction side. Further, the conducting wire holding portion 43 may extend upward from an end of the inner protruding portion 42 on one circumferential direction side.

Figure 7:
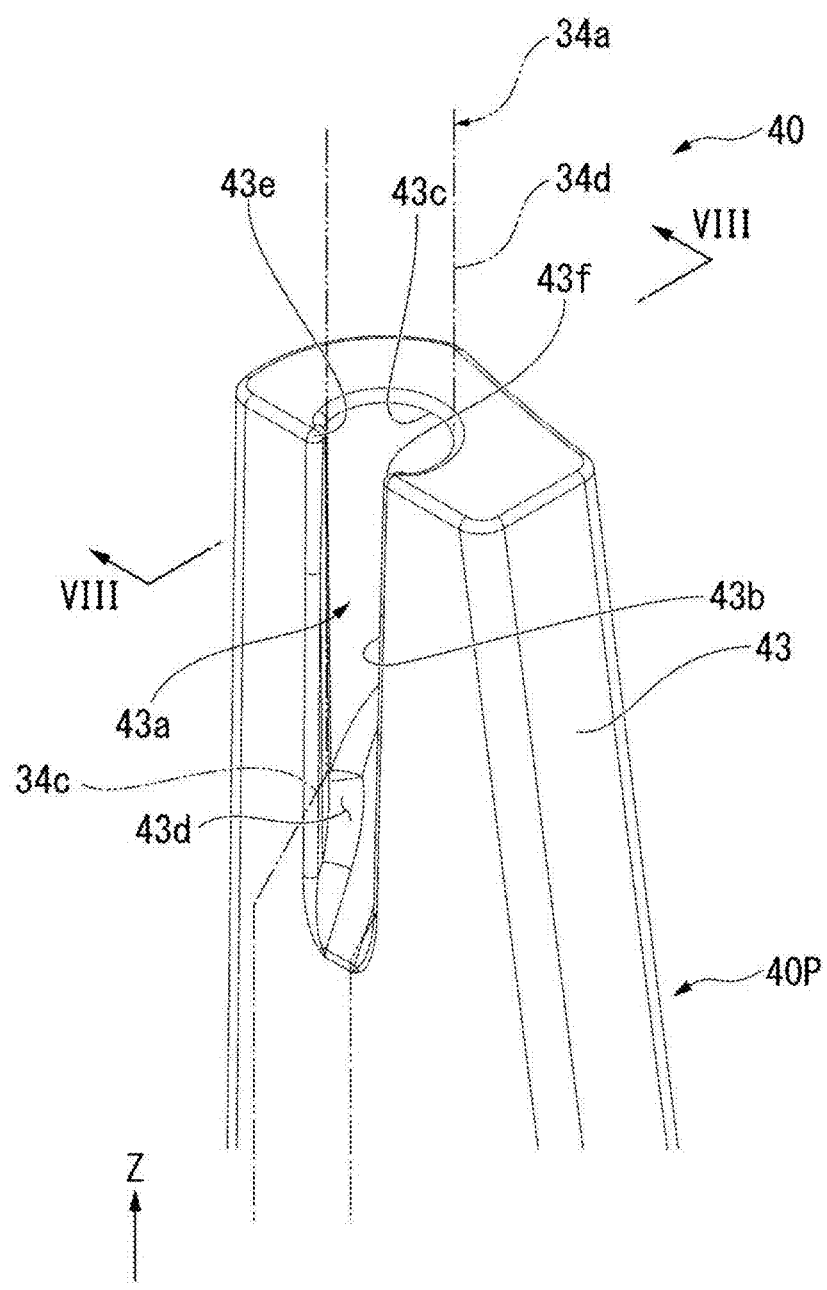
FIG. 7 is a perspective view showing a conducting wire holding portion of an example embodiment of the present disclosure.

As shown in FIG. 7, the conducting wire holding portion 43 has a holding groove portion 43a. The holding groove portion 43a is recessed radially inward from the radially outer face of the conducting wire holding portion 43 and extends in the axial direction. The coil lead 34a is held by the holding groove portion 43a. Therefore, it is possible to suppress movement of the coil lead 34a in the circumferential direction by the holding groove portion 43a. Thereby, it is possible to suppress the problem that the coil leads 34a of the coils 34 adjacent to each other in the circumferential direction contact each other to cause a short circuit.

The holding groove portion 43a has a first opening 43b and a second opening 43c. The first opening 43b is open radially outward. The first opening 43b extends in the axial direction.

The first opening 43b has a rectangular shape that is long in the axial direction. The upper end of the first opening 43b is connected to the second opening 43c. The second opening 43c is open upward at the upper end of the holding groove portion 43a. That is, the upper end of the holding groove portion 43a is open. The second opening 43c has a substantially circular shape. The lower end of the holding groove portion 43a is closed.

In the cross section orthogonal to the axial direction, the inner edge of the holding groove portion 43a is arc-shaped. The inner diameter of the holding groove portion 43a is larger than the opening width of the first opening 43b. The opening width of the first opening 43b is a dimension of the first opening 43b in the direction orthogonal to both the axial direction in which the first opening 43b extends and the radial direction in which the first opening 43b is open. The opening width of the first opening 43b is uniform over the entire axial direction in a state in which the coil lead 34a is not held, and is smaller than the outer diameter of the coil lead 34a. The opening width of the second opening 43c is larger than the outer diameter of the coil lead 34a. The opening width of the second opening 43c is an inner diameter at the upper end of the holding groove portion 43a.

Figure 8:
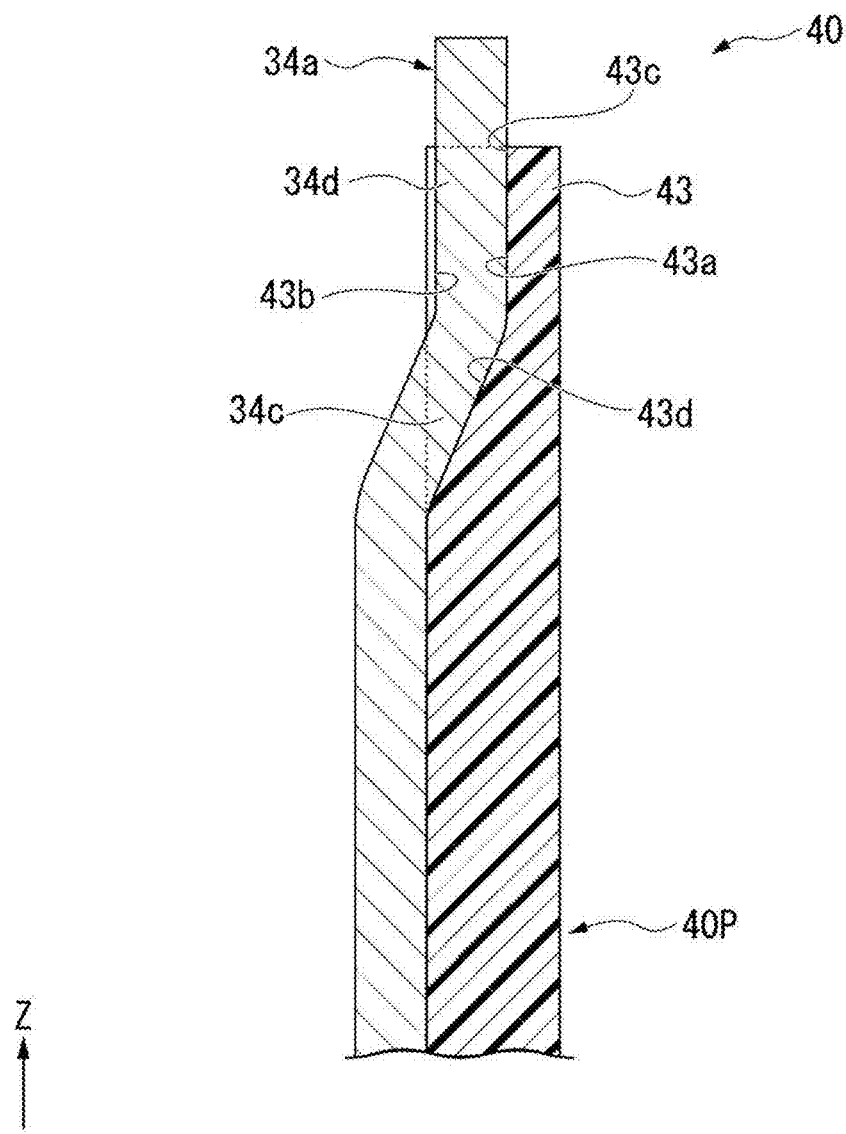
FIG. 8 is a cross-sectional view of a conducting wire holding portion taken along line VIII-VIII in FIG. 7 of an example embodiment of the present disclosure.

As shown in FIGS. 7 and 8, the lower portion of the bottom face of the holding groove portion 43a is an inclined portion 43d located radially outward as it goes downward. The lower end of the inclined portion 43d is connected to the radially outer face of the conducting wire holding portion 43.

The coil lead 34a held by the holding groove portion 43a has a first portion 34c and a second portion 34d. The first portion 34c is a portion inserted into the lower portion of the first opening 43b. The second portion 34d is connected to the distal end, that is, the upper side, of the first portion 34c. The second portion 34d is a portion that passes through the inside of the holding groove portion 43a and protrudes from the second opening 43c to the outside of the holding groove portion 43a.

As described above, in the state in which the coil lead 34a is not held, the opening width of the first opening 43b is smaller than the outer diameter of the coil lead 34a. For this reason, when the first portion 34c of the coil lead 34a is inserted into the first opening 43b, edge portions 43e and 43f of the first opening 43b on two sides in the circumferential direction are partially elastically deformed, and the opening width of the first opening 43b partially widens. Thereby, the edge portions 43e and 43f of the first opening 43b on two sides in the circumferential direction contact the first portion 34c in the elastically deformed state, and pinch the first portion 34c. Therefore, the coil lead 34a can be firmly fixed to the holding groove portion 43a.

On the other hand, the opening width of the second opening 43c is larger than the outer diameter of the coil lead 34a. Therefore, a clearance is provided between the second portion 34d passing through the second opening 43c and the inner edge of the second opening 43c. As a result, while the coil lead 34a is guided upward along the holding groove portion 43a, and the coil lead 34a is positioned, the position of the coil lead 34a can be finely adjusted by the clearance between the inner edge of the second opening 43c and the coil lead 34a. Therefore, it is easy to connect the coil lead 34a to another member. The other member in the present example embodiment is the second bus bar 70.

In addition, the opening width of the first opening 43b is widen to be equal to the outer diameter of the first portion 34c at a portion where the first portion 34c is inserted and its vicinity, and is smaller than the outer diameter of the first portion 34c at other portions. Thus, the opening width of the first opening 43b is smaller than the outer diameter of the coil lead 34a at the upper end of the holding groove portion 43a. Therefore, it is possible to prevent the second portion 34d accommodated in the holding groove portion 43a from coming out of the first opening 43b to the outside of the holding groove portion 43a.

The upper end of the first opening 43b is connected to the second opening 43c. For this reason, a worker or the like who holds the coil lead 34a in the holding groove portion 43a folds the coil lead 34a extending upward above the conducting wire holding portion 43 at the radially inside of the conducting wire holding portion 43 toward radially inside, and push it from the first opening 43b into the holding groove portion 43a, so that the coil lead 34a can be easily held by the holding groove portion 43a.

As above, according to this example embodiment, the motor 10 which has a structure in which the coil lead 34a can be held easily and firmly, and the position of the coil lead 34a can be finely adjusted is provided. In the present specification, "worker and the like" include a worker who performs a target work and a device that performs a target work.

Further, according to the present example embodiment, the lower portion of the bottom face of the holding groove portion 43a is the inclined portion 43d located radially outward as it goes downward. Therefore, as shown in FIG. 8, the coil lead 34a can be attached along the inclined portion 43d. Thus, when the coil lead 34a is held in the holding groove portion 43a, it is not necessary to bend the coil lead 34a largely, and the coil lead 34a can be easily held in the holding groove portion 43a.

Further, according to the present example embodiment, in the cross section orthogonal to the axial direction, the inner edge of the holding groove portion 43a is arc-shaped. Therefore, the inner face of the holding groove portion 43a can be attached along the outer peripheral face of the second portion 34d accommodated in the holding groove portion 43a. Therefore, the second portion 34d can be stably held inside the holding groove portion 43a, and it is easy to position the coil lead 34a with high accuracy.

As shown in FIG. 4, the outer protruding portion 44 protrudes upward from the upper edge portion of the radially outer end of the tube portion 41. The outer protruding portion 44 extends to the one circumferential direction side relative to the tube portion 41. More specifically, the outer protruding portion 44 extend to two sides in the circumferential direction relative to the tube portion 41. In the present example embodiment, the outer protruding portion 44 is part of the flange portion extending from the entire circumference of the radially outer end of the tube portion 41 to the outer side of the tube portion 41. In the present example embodiment, the outer protruding portion 44 corresponds to an axial protruding portion.

The bus bar holding portion 45 has a base portion 45a, support portions 45b and 45c, a pair of wall portions 46a and 46b, and a pair of wall portions 47a and 47b. That is, the insulator 40 has the base portion 45a, the support portions 45b and 45c, the pair of wall portions 46a and 46b, and the pair of wall portions 47a and 47b. The base portion 45a protrudes upward from the outer protruding portion 44. The base portion 45a has a substantially rectangular parallelepiped shape extending in the circumferential direction. The circumferential center of the base portion 45a is disposed closer to the other circumferential direction side than the circumferential center of the tube portion 41.

Figure 9:
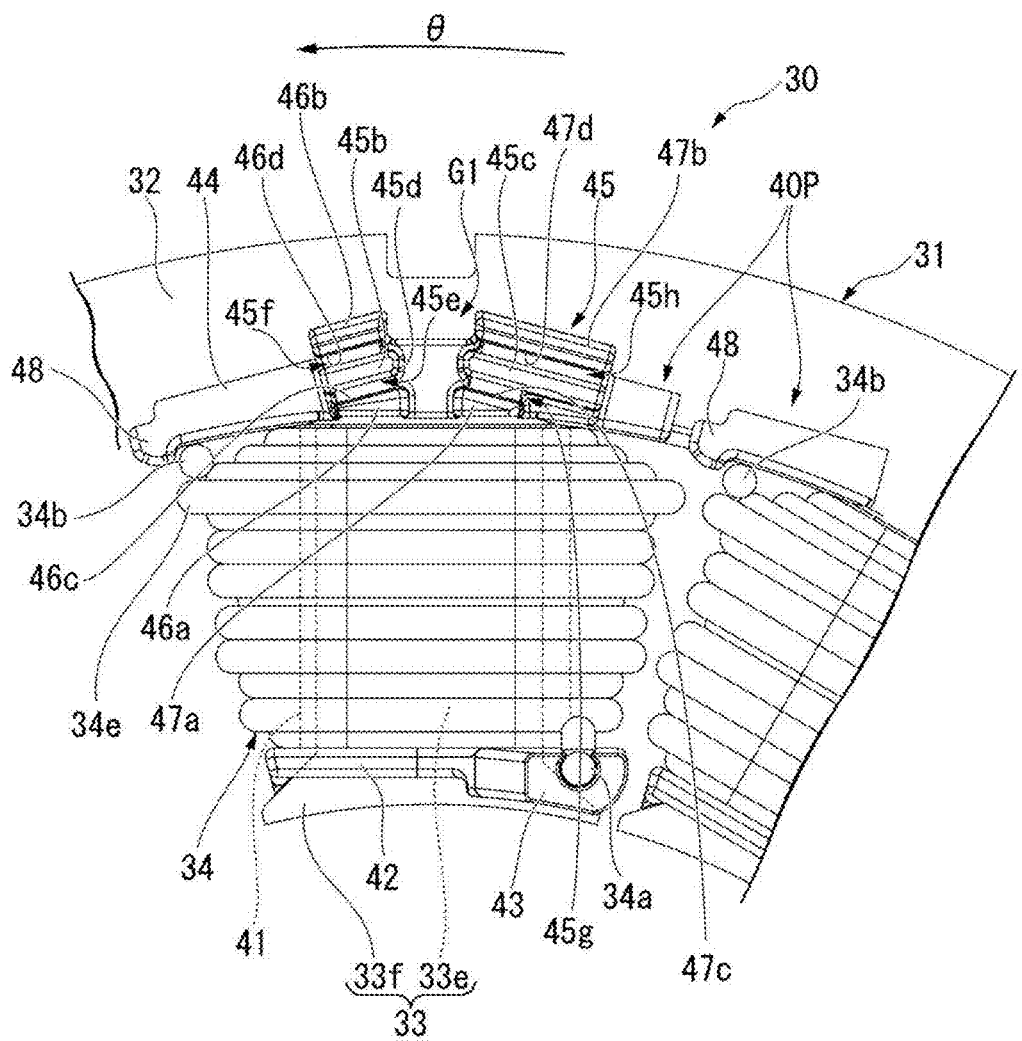
FIG. 9 is a view of a portion of the stator of an example embodiment of the present disclosure as viewed from the upper side.

The support portion 45b protrudes upward from a portion of the upper end of the base portion 45a on one circumferential direction side. As shown in FIG. 9, the support portion 45b is disposed on the one circumferential direction side relative to the circumferential center of the tube portion 41. The support portion 45b linearly extends in a direction orthogonal to the axial direction. The extending direction of the support portion 45b is a direction located inward in the extending radial direction of the teeth 33 to which the insulator piece 40P is mounted as it goes to the one circumferential direction side. The direction parallel to the direction in which the support portion 45b extends is referred to as a "first extending direction".

Figure 10:
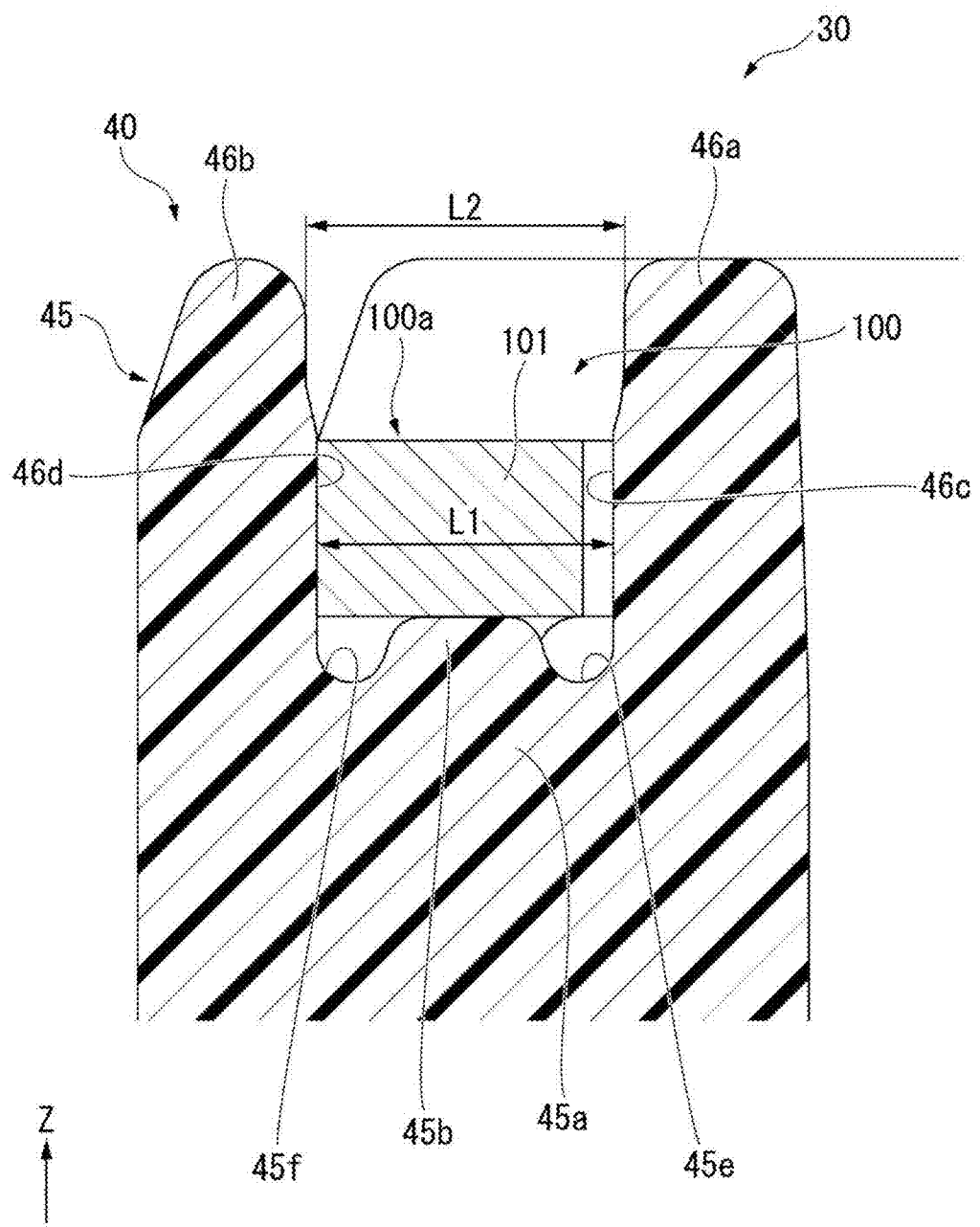
FIG. 10 is a cross-sectional view showing a portion of the insulator and a portion of the first bus bar taken along line X-X in FIG. 3 of an example embodiment of the present disclosure.

The support portion 45b extends to an end of the upper end of the base portion 45a on one circumferential direction side from a portion on one circumferential direction side. As shown in FIG. 10, the cross-sectional shape orthogonal to the first extending direction of the support portion 45b is a substantially trapezoidal shape in which the upper bottom is smaller than the lower bottom. In the direction orthogonal to the first extending direction, the edge portions on two sides of the upper end of the support portion 45b are rounded. The support portion 45b supports a first bus bar main body 100a described below from below.

As shown in FIG. 4, the support portion 45c protrudes upward from a portion of the upper end of the base portion 45a on the other circumferential direction side. As shown in FIG. 9, the support portion 45c is disposed on the other circumferential direction side relative to the circumferential center of the tube portion 41. The support portion 45c linearly extends in a direction orthogonal to the first extending direction of the support portion 45b of the direction orthogonal to the axial direction. The extending direction of the support portion 45c is a direction located inward in the extending radial direction of the teeth 33 to which the insulator piece 40P is mounted as it goes to the other circumferential direction side. A direction parallel to the direction in which the support portion 45c extends is referred to as a "second extending direction".

The support portion 45c extends to an end of the upper end of the base portion 45a on the other circumferential direction side from the circumferential center portion. Although illustration is omitted, the cross-sectional shape orthogonal to the second extending direction of the support portion 45c is, for example, the same as that of the support portion 45b. The support portion 45c supports the first bus bar main body 100a described below from below. The extension length of the support portion 45c is larger than the extending length of the support portion 45b.

As shown in FIG. 4, the wall portion 46a protrudes upward from the radially inner edge portion of a portion of the upper end of the base portion 45a on one circumferential direction side. The wall portion 46b protrudes upward from the radially outer edge portion of a portion of the upper ends of the base portion 45a on one circumferential direction side. The wall portion 46a is disposed radially inside of the support portion 45b. The wall portion 46b is disposed radially outward of the support portion 45b. The pair of wall portions 46a and 46b extend in the first extending direction. As shown in FIG. 9, the extension length of the wall portion 46a and the extension length of the wall portion 46b are substantially the same as the extension length of the support portion 45b.

The pair of wall portions 46a and 46b are arranged in a direction perpendicular to the axial direction and in a direction intersecting the first extending direction. The direction in which the pair of wall portions 46a and 46b are arranged is referred to as a first sandwiching direction. In the present example embodiment, the first sandwiching direction is a direction orthogonal to both the axial direction and the first extending direction. The pair of wall portions 46a and 46b sandwiches the support portion 45b in the first sandwiching direction. That is, the support portion 45b is disposed between the pair of wall portions 46a and 46b. A wall face 46c of the wall portion 46a on the support portion 45b side extends in the first extending direction. A wall face 46d of the wall portion 46b on the support portion 45b side extends in the first extending direction. The wall face 46c and the wall face 46d face each other via a clearance. That is, the pair of wall portions 46a and 46b have the wall faces 46c and 46d facing each other with a clearance therebetween and extending in the first extending direction.

As shown in FIG. 10, a distance L2 between the upper portion of the wall face 46c and the upper portion of the wall face 46d is greater than a distance L1 between the lower portion of the wall face 46c and the lower portion of the wall face 46d. Therefore, the distance between the pair of wall portions 46a and 46b increases at the upper portion.

As shown in FIG. 4, the wall portion 47a protrudes upward from the radially inner edge portion of a portion of the upper end of the base portion 45a on the other circumferential direction side. The wall portion 47a is disposed radially inside of a portion of the support portion 45c on one circumferential direction side. The wall portion 47a is not disposed radially inside of a portion of the support portion 45c on the other circumferential direction side. The wall portion 47b protrudes upward from the radially outer edge portion of a portion of the upper ends of the base portion 45a on the other circumferential direction side. The wall portion 47b is disposed radially outward of the support portion 45c.

The pair of wall portions 47a and 47b extend in the second extending direction. As shown in FIG. 9, the extension length of the wall portion 47a is smaller than the extension length of the support portion 45c. The extension length of the wall portion 47b is larger than the extension lengths f the wall portions 46a, 46b, and 47a. The extension length of the wall portion 47b is substantially the same as the extension length of the support portion 45c. The wall portion 47a has substantially the same shape as the wall portion 46a except that the wall portion 47a is symmetrical in the circumferential direction.

The pair of wall portions 47a and 47b are arranged in a direction perpendicular to the axial direction and in a direction intersecting the second extending direction. The direction in which the pair of wall portions 47a and 47b are arranged is referred to as a second sandwiching direction. In the present example embodiment, the second sandwiching direction is a direction orthogonal to both the axial direction and the second extending direction. The pair of wall portions 47a and 47b sandwich the support portion 45c in the second sandwiching direction. That is, the support portion 45c is disposed between the pair of wall portions 47a and 47b. A wall face 47c of the wall portion 47a on the support portion 45c side extends in the second extending direction. A wall face 47d of the wall portion 47b on the support portion 45c side extends in the second extending direction. The wall face 47c and the wall face 47d face each other via a clearance. That is, the pair of wall portions 47a and 47b have the wall faces 47c and 47d facing each other with a clearance therebetween and extending in the second extending direction. Although the illustration is omitted, the distance between the pair of wall portions 47a and 47b is larger at the upper portion as in the wall portions 46a and 46b.

In one insulator piece 40P, a space portion G1 is provided between the wall portions 46a and 46b and the wall portions 47a and 47b. The support portion 45b and the support portion 45c are spaced apart in the circumferential direction via the space portion G1. The wall portions 46a and 46b and the wall portions 47a and 47b are spaced apart in the circumferential direction via the space portion G1. In the present example embodiment, the space portion G1 includes a space between the support portion 45b and the support portion 45c in the circumferential direction, and a space between the wall portions 46a and 46b and the wall portions 47a and 47b in the circumferential direction. The space portion G1 penetrates the bus bar holding portion 45 in the radial direction. The space portion G1 is open on the upper side and on two sides in the radial direction. The space portion G1 is disposed at the same circumferential position as the circumferential center of the tube portion 41.

As shown in FIG. 3, the first extending direction in which the support portion 45b and the pair of wall portions 46a and 46b extend is parallel to the second extending direction in which the support portion 45c and the pair of wall portions 47a and 47b of the insulator pieces 40P adjacent on the one circumferential direction side extend. The support portion 45c and the pair of wall portions 47a and 47b of the insulator pieces 40P adjacent on the one circumferential direction side are disposed on the extension of the support portion 45b and the pair of wall portions 46a and 46b.

In the pair of insulator pieces 40P adjacent to each other in the circumferential direction, a space portion G2 is provided between the wall portions 47a and 47b of the insulator piece 40P disposed on the one circumferential direction side and the wall portions 46a and 46b of the insulator piece 40P disposed on the other circumferential direction side. The wall portions 47a and 47b of the insulator piece 40P disposed on the one circumferential direction side and the wall portions 46a and 46b of the insulator piece 40P disposed on the other circumferential direction side are spaced apart in the circumferential direction via the space portion G2.

As shown in FIG. 4, the space portion G2 includes a space, in the circumferential direction, between of the bus bar holding portions 45 of the pair of insulator pieces 40P adjacent to each other in the circumferential direction. The space portion G2 is open on the upper side and on two sides in the radial direction. The dimension of the space portion G2 in the circumferential direction is larger than the dimension of the space portion G1 in the circumferential direction.

Figure 11:
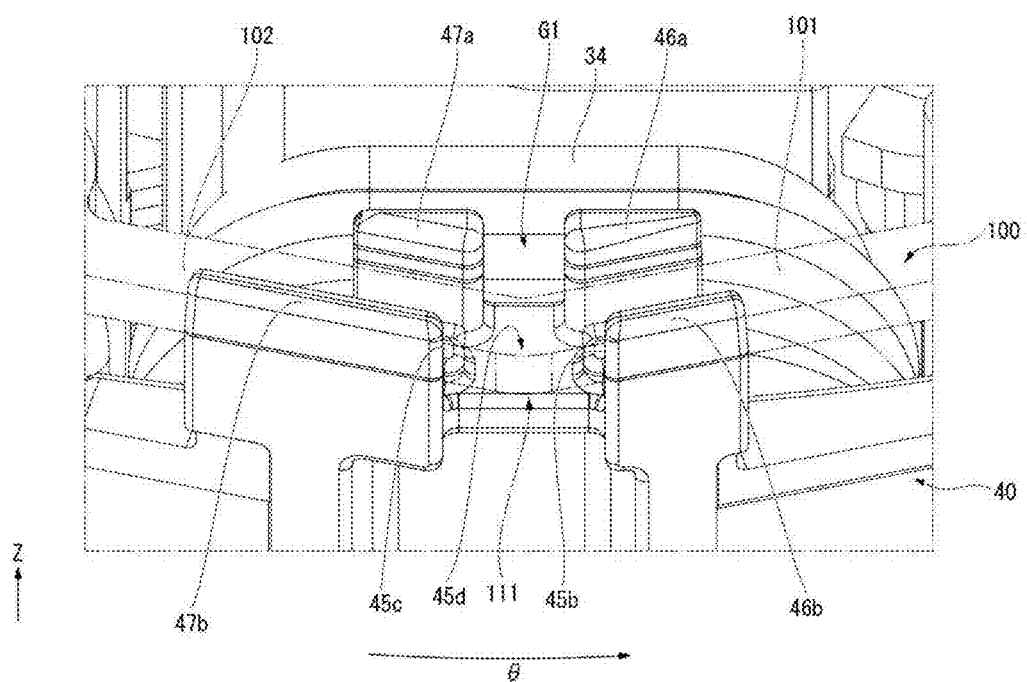
FIG. 11 is a perspective view showing a portion of an insulator and a portion of a first bus bar of an example embodiment of the present disclosure.

As shown in FIG. 11, since the support portion 45b and the support portion 45c are spaced apart in the circumferential direction via the space portion G1, a recess 45d which is recessed downward is provided between the support portion 45b and the support portion 45c. That is, the insulator 40 has the recess 45d. The recess 45d is open on two sides in the radial direction. The inside of the recess 45d is included in, for example, the space portion G1.

As shown in FIG. 9, the bus bar holding portion 45 has groove portions 45e, 45f, 45g, and 45h. That is, the insulator 40 has the groove portions 45e, 45f, 45g, and 45h. As shown in FIG. 10, the groove portion 45e is recessed downward between the wall portion 46a and the support portion 45b. The groove portion 45f is recessed downward between the wall portion 46b and the support portion 45b. As shown in FIG. 9, the groove portions 45e and 45f extend in the first extending direction. Both ends of the groove portions 45e and 45f in the first extending direction are open. The groove portion 45g is recessed downward between the wall portion 47a and the support portion 45c. The groove portion 45h is recessed downward between the wall portion 47b and the support portion 45c. The groove portions 45g and 45h extend in the second extending direction. Both ends in the second extending direction of the groove portions 45g and 45h are open.

The pressing portion 48 protrudes radially inward from the outer protruding portion 44. More specifically, the pressing portion 48 protrudes radially inward from an end of the outer protruding portion 44 on one circumferential direction side. The pressing portion 48 is disposed on the one circumferential direction side relative to the tube portion 41. The pressing portion 48 is a portion that presses the coil lead 34b.

The coil lead 34b is disposed between the pressing portion 48 and the coil 34 on the other circumferential direction side of the pressing portion 48 as viewed along the axial direction. Therefore, the coil lead 34b can be easily sandwiched between the pressing portion 48 and the coil 34, and it is possible to further suppress disengagement and movement of the coil lead 34b from the coil 34. Thereby, it is easy to connect coil lead 34b, which is an end of the conducting wire constituting coil 34 on the side of winding end side, to the first bus bar 100. Further, since the coil lead 34b can be pressed by using the coil 34, the shape of the pressing portion 48 can be easily simplified. Thereby, the structure of the insulator 40 can be simplified and the manufacturing cost of the motor 10 can be reduced. As described above, according to the present example embodiment, it is possible to provide the motor 10 provided with the insulator 40 having a simple structure and capable of suppressing the movement of the coil lead 34b on the winding end side.

In the present example embodiment, the coil lead 34b is disposed between the outermost peripheral conducting wire 34e and the outer protruding portion 44 in the radial direction. As viewed along the axial direction, the distance between an end of the outermost peripheral conducting wire 34e on one circumferential direction side and the pressing portion 48 is smaller than the outer diameter of the coil lead 34b. Therefore, it is possible to suppress coming-off, on the one circumferential direction side, of the coil lead 34b from between the outermost peripheral conducting wire 34e and the pressing portion 48. Therefore, it is possible to further suppress disengagement and movement of the coil lead 34b from the coil 34.

As shown in FIG. 4, the pressing portion 48 extends in the axial direction. Thereby, the dimension of a portion supported by the pressing portion 48 of the coil lead 34b in the axial direction can be enlarged. Therefore, movement of the coil lead 34b can be further suppressed by the pressing portion 48. In addition, the coil lead 34b can be guided upward along the pressing portion 48, and the coil lead 34b can be positioned accurately.

The lower end of the pressing portion 48 is disposed below an upper corner portion 34f of the outermost peripheral conducting wire 34e. The lower portion of the outermost peripheral conducting wire 34e below the corner portion 34f is a portion extending in the axial direction, and is an end of the outermost peripheral conducting wire 34e on one circumferential direction side. For this reason, by extending the pressing portion 48 below the corner portion 34f, an end of the outermost peripheral conducting wire 34e on one circumferential direction side and a portion of the pressing portion 48 can face each other in a direction orthogonal to the axial direction. Accordingly, it is possible to more reliably suppress coming-off, on the one circumferential direction side, of the coil lead 34b from between an end of the outermost peripheral conducting wire 34e on one circumferential direction side and the pressing portion 48.

As shown in FIG. 6, the lower end of the pressing portion 48 is disposed at the same position in the axial direction as the upper face of the teeth 33 or above the upper face of the teeth 33. Therefore, it is possible to suppress the problem that the pressing portion 48 extends downward too much. Thereby, when producing the coil 34 by winding a conducting wire, it is possible to suppress interference of a conducting wire with the pressing portion 48. Therefore, the coil 34 can be easily manufactured. In the present example embodiment, the lower end of the pressing portion 48 is disposed at the same position as the upper face of the teeth 33 in the axial direction.

The upper end of the pressing portion 48 is disposed above the coil 34. Therefore, the dimension of the pressing portion 48 in the axial direction can be increased, and the dimension of a portion of the coil lead 34b supported by the pressing portion 48 in the axial direction can be further increased. Therefore, movement of the coil lead 34b can be further suppressed by the pressing portion 48. In addition, the coil lead 34b can be more easily guided upward along the pressing portion 48, and the coil lead 34b can be more accurately positioned.

As shown in FIG. 2, the plurality of first bus bars 100 is electrically connected to the stator 30 on the upper side of the stator 30. The first bus bar 100 has a plate shape whose plate face is orthogonal to the axial direction. Therefore, the dimension of the first bus bar 100 in the axial direction can be reduced, and the motor 10 can be easily downsized in the axial direction. The first bus bar 100 extends along a plane orthogonal to the axial direction. The shapes of the respective first bus bars 100 are the same with each other.

In the present specification, in each portion of the first bus bar, a direction orthogonal to both the thickness direction of each portion and the direction in which each portion extends is referred to as the "width direction" of each portion. In the present example embodiment, the width direction of the first bus bar is a direction orthogonal to the axial direction.

As shown in FIG. 3, one first bus bar 100 is supported from below by four insulator pieces 40P adjacent to each other in the circumferential direction. The four insulator pieces 40P supporting first bus bar 100 are a first insulator piece 40P1, a second insulator piece 40P2, a third insulator piece 40P3, and a fourth insulator piece 40P4 from the one circumferential direction side toward the other circumferential direction side. That is, the plurality of insulator pieces 40P includes, as the insulator pieces 40P arranged adjacent to each other in the circumferential direction, the first insulator piece 40P1, the second insulator piece 40P2, the third insulator piece 40P3, and the fourth insulator piece 40P4.

The first bus bar 100 includes the first bus bar main body 100a and coil connection portions 121, 122, and 123. The first bus bar main body 100a extends along a plane orthogonal to the axial direction. In the present example embodiment, the first bus bar main body 100a extends in the shape of a polygonal line along the circumferential direction. In the present specification, "the shape of a polygonal line along the circumferential direction" includes, for example, a shape along sides of a polygon inscribed in a virtual circle having the center axis J as the center. In the present example embodiment, the first bus bar main body 100a has a shape along three adjacent sides of a dodecagon inscribed in a virtual circle having the center axis J as the center.

The first bus bar main body 100a is supported by the insulator 40 radially outside relative to the coil 34. The first bus bar main body 100a is held by the bus bar holding portion 45. The first bus bar main body 100a includes a first extending portion 101, a second extending portion 102, and a third extending portion 103.

The first extending portion 101 is held across the first insulator piece 40P1 and the second insulator piece 40P2. The first extending portion 101 is supported from below by the support portion 45c of the first insulator piece 40P1 and the support portion 45b of the second insulator piece 40P2. Thereby, the first extending portion 101 bridges over the support portion 45c of the first insulator piece 40P1 and the support portion 45b of the second insulator piece 40P2. That is, the first bus bar main body 100a bridges over the support portion 45c of the first insulator piece 40P1 and the support portion 45b of the second insulator piece 40P2.

The first extending portion 101 extends in a first direction D1 orthogonal to the axial direction. In the present example embodiment, a first direction D1 is the second extending direction of the first insulator piece 40P1, and is the first extending direction of the second insulator piece 40P2.

One end of the first extending portion 101 in the first direction D1 is disposed between the pair of wall portions 47a and 47b of the first insulator piece 40P1. One end of the first extending portion 101 in the first direction D1 is sandwiched by the pair of wall portions 47a and 47b of the first insulator piece 40P1 in a first orthogonal direction which is a direction orthogonal to the axial direction and intersecting the first direction D1. In the present example embodiment, the first orthogonal direction is a second sandwiching direction of the first insulator piece 40P1, and the first sandwiching direction of the second insulator piece 40P2. That is, in the present example embodiment, the first orthogonal direction is orthogonal to both the axial direction and the first direction D1. One end of the first extending portion 101 in the first direction D1 is an end of the first extending portion 101 on one circumferential direction side, and is an end of the first bus bar main body 100a on one circumferential direction side.

One end of the first extending portion 101 in the first direction D1 is a widening portion 101a whose dimension in the first orthogonal direction is large. Therefore, the clearance between the first extending portion 101 and the pair of wall portions 47a and 47b can be reduced between the pair of wall portions 47a and 47b. Thereby, the first bus bar 100 can be more stably held by the insulator 40. The end face of the one end of the first extending portion 101 in the first direction D1 is exposed to the space portion G1 of the first insulator piece 40P1.

The second extending portion 102 is connected to the other end of the first extending portion 101 in the first direction D1. That is, one end of the first extending portion 101, which is the widening portion 101a, in the first direction D1 is an end opposite to a portion connected to the second extending portion 102 of the first extending portion 101. The other end of the first extending portion 101 in the first direction D1 is disposed between the pair of wall portions 46a and 46b of the second insulator piece 40P2. The other end of the first extending portion 101 in the first direction D1 is an end of the first extending portion 101 on the other circumferential direction side.

As above, while in the first orthogonal direction, the first extending portion 101 is sandwiched by the pair of wall portions 47a and 47b of the first insulator piece 40P1, it is sandwiched by the pair of wall portions 46a and 46b of the second insulator piece 40P2.

The second extending portion 102 is held across the second insulator piece 40P2 and the third insulator piece 40P3. The second extending portion 102 is supported from below by the support portion 45c of the second insulator piece 40P2 and the support portion 45b of the third insulator piece 40P3. Thereby, the second extending portion 102 bridges over the support portion 45c of the second insulator piece 40P2 and the support portion 45b of the third insulator piece 40P3. That is, the first bus bar main body 100a bridges over the support portion 45c of the second insulator piece 40P2 and the support portion 45b of the third insulator piece 40P3.

The second extending portion 102 extends, in a second direction D2 orthogonal to the axial direction and intersecting the first direction D1, from the other end of the first extending portion 101 in the first direction D1. In the present example embodiment, the second direction D2 is the second extending direction of the second insulator piece 40P2, and is the first extending direction of the third insulator piece 40P3.

One end of the second extending portion 102 in the second direction D2 is disposed between the pair of wall portions 47a and 47b of the second insulator piece 40P2. One end of the second extending portion 102 in the second direction D2 is sandwiched by the pair of wall portions 47a and 47b of the second insulator piece 40P2 in a second orthogonal direction which is a direction orthogonal to the axial direction and intersecting the second direction D2. In the present example embodiment, the second orthogonal direction is the second sandwiching direction of the second insulator piece 40P2, and the first sandwiching direction of the third insulator piece 40P3. That is, in the present example embodiment, the second orthogonal direction is orthogonal to both the axial direction and the second direction D2. One end of the second extending portion 102 in the second direction D2 is an end of the second extending portion 102 on one circumferential direction side. The third extending portion 103 is connected to the other end of the second extending portion 102 in the second direction D2. The other end of the second extending portion 102 in the second direction D2 is disposed between the pair of wall portions 46a and 46b in the third insulator piece 40P3. The other end of the second extending portion 102 in the second direction D2 is an end of the second extending portion 102 on the other circumferential direction side.

As above, while in the second orthogonal direction, the second extending portion 102 is sandwiched by the pair of wall portions 47a and 47b of the second insulator piece 40P2, it is sandwiched by the pair of wall portions 46a and 46b of the third insulator piece 40P3.

The third extending portion 103 is held across the third insulator piece 40P3 and the fourth insulator piece 40P4. The third extending portion 103 is supported from below by the support portion 45c of the third insulator piece 40P3 and the support portion 45b of the fourth insulator piece 40P4. Thus, the third extending portion 103 bridges over the support portion 45c of the third insulator piece 40P3 and the support portion 45b of the fourth insulator piece 40P4. That is, the first bus bar main body 100a bridges over the support portion 45c of the third insulator piece 40P3 and the support portion 45b of the fourth insulator piece 40P4.

The third extending portion 103 extends, in a third direction D3 orthogonal to the axial direction and intersecting the second direction D2, from the other end of the second extending portion 102 in the second direction D2. In the present example embodiment, the third direction D3 is the second extending direction of the third insulator piece 40P3 and the first extending direction of the fourth insulator piece 40P4. The third direction D3 is a direction that intersects the first direction D1.

One end of the third extending portion 103 in the third direction D3 is disposed between the pair of wall portions 47a and 47b of the third insulator piece 40P3. One end of the third extending portion 103 in the third direction D3 is sandwiched by the pair of wall portions 47a and 47b of the third insulator piece 40P3 in a third orthogonal direction which is a direction orthogonal to the axial direction and intersecting the third direction D3. In the present example embodiment, the third orthogonal direction is the second sandwiching direction of the third insulator piece 40P3, and the first sandwiching direction of the fourth insulator piece 40P4. That is, in the present example embodiment, the third orthogonal direction is orthogonal to both the axial direction and the third direction D3. One end of the third extending portion 103 in the third direction D3 is an end of the third extending portion 103 on one circumferential direction side. The other end of the third extending portion 103 in the third direction D3 is disposed between the pair of wall portions 46a and 46b of the fourth insulator piece 40P4. The other end of the third extending portion 103 in the third direction D3 is an end of the third extending portion 103 on the other circumferential direction side, and is an end of the first bus bar main body 100a on the other circumferential direction side.

As above, while in the third orthogonal direction, the third extending portion 103 is sandwiched by the pair of wall portions 47a and 47b of the third insulator piece 40P3, it is sandwiched by the pair of wall portions 46a and 46b of the fourth insulator piece 40P4.

The other end of the third extending portion 103 in the third direction D3 is a widening portion 103a whose dimension in the third orthogonal direction is large. Therefore, the clearance between the third extending portion 103 and the pair of wall portions 46a and 46b can be reduced between the pair of wall portions 46a and 46b. Thereby, the first bus bar 100 can be more stably held by the insulator 40. The end face of the other end of the third extending portion 103 in the third direction D3 is exposed to the space portion G1 of the fourth insulator piece 40P4.

Each extending portion is positioned along the wall face of each wall portion between the pair of wall portions. Thereby, the first bus bar 100 is positioned and held by the insulator 40.

A first corner portion 111, which is a corner portion where the first extending portion 101 and the second extending portion 102 are connected, is disposed in the space portion G1 of the second insulator piece 40P2. No wall portion is provided on two sides of the first corner portion 111 in the width direction, and the first corner portion 111 is not sandwiched by the wall portion.

For example, in the case where a pair of wall portions is provided on two sides of a first corner portion in the width direction, the pair of wall portions bend and extend along the first corner portion. In this case, the first corner portion is fitted between the corner portions of the pair of wall portions which are bent. However, when there is an error in the dimension of the first bus bar due to an error in the length of the first extending portion or the length of the second extending portion, or the like, the position of the first corner portion may be shifted with respect to the corner portions of the pair of wall portions which are bent and the first corner portion may not be fitted between the wall portions. Therefore, the first bus bar may not be disposed between the pair of wall portions.

On the other hand, according to the present example embodiment, the first corner portion 111 is disposed in the space portion G1. Therefore, even when an error occurs in the dimension of the first bus bar 100, the position of the first corner portion 111 is allowed to be shifted for the width of the space portion G1. Thereby, even when the position of the first corner portion 111 is shifted due to the dimensional error, the first bus bar 100 can be disposed between the wall portions. Therefore, the first bus bar 100 can be easily disposed, and the assembly work efficiency of the motor 10 can be improved. As a result, according to this example embodiment, it is possible to provide the motor 10 having a structure capable of improving the assembly work efficiency.

Further, according to the present example embodiment, the holding member for holding the first bus bar 100 is the insulator 40. Therefore, the first bus bar 100 can be held using the insulator 40 without separately providing a holding member for holding the first bus bar 100. Therefore, the number of parts of the motor 10 can be reduced, and the assembly work efficiency can be further improved.

Further, according to the present example embodiment, the first bus bar main body 100a is supported by the insulator 40 radially outside relative to the coil 34. For this reason, for example, as compared with the case where the first bus bar main body 100a is supported by the insulator 40 radially inside relative to the coil 34, it is easy to secure a large area of the insulator 40 for holding the first bus bar main body 100a. Therefore, the first bus bar 100 is easily held by the insulator 40. In addition, the first bus bar main body 100a extends in the shape of a polygonal line along the circumferential direction. Therefore, it is easy to dispose the first bus bar main body 100a at a portion of the insulator 40 radially outside relative to the coil 34.

The first corner portion 111 is disposed at a position overlapping the second insulator piece 40P2 as viewed along the axial direction. Therefore, the vicinity of the first corner portion 111 can be easily supported by the second insulator piece 40P2. Thereby, the first bus bar 100 can be stably held by the insulator 40.

As shown in FIG. 11, the apex of the first corner portion 111 is directed radially outward. The portions of the insulator 40 are not disposed on two sides of the first corner portion 111 in the radial direction. When the insulator 40 is viewed from radially outward, the first corner portion 111 is exposed to the outside of the insulator 40. When the insulator 40 is viewed from radially inward, the first corner portion 111 is exposed to the outside of the insulator 40. The first corner portion 111 overlaps the recess 45*d* as viewed along the axial direction.

For example, in the case of producing the first bus bar 100 by bending a linearly extending plate member, a bending may occur in the first corner portion 111 to be bent, and a portion of the first corner portion 111 may axially buckle. Therefore, when the first corner portion 111 is supported from below, the first corner portion 111 may be lifted due to the buckled portion. As a result, the first bus bar may be lifted, and the first bus bar may not be accurately disposed.

On the other hand, according to this example embodiment, even when part of the first corner portion 111 is buckled, the buckled portion can be escaped by the recess 45*d*. Therefore, lift of the first bus bar 100 can be suppressed. Therefore, the first bus bar 100 can be arranged accurately.

As shown in FIG. 3, a second corner portion 112, which is a corner portion where the second extending portion 102 and the third extending portion 103 are connected, is disposed in the space portion G1 of the third insulator piece 40P3. No wall portion is provided on two sides of the second corner portion 112 in the width direction, and the second corner portion 112 is not sandwiched by the wall portion.

Thus, in the present example embodiment, the first corner portion 111 and the second corner portion 112, as two corner portions, are provided in one first bus bar main body 100*a*. In this case, for example, when a pair of wall portions is provided on two sides of each corner portion in the width direction, it is necessary to align two sides of each corner portion with the respective bent corner portions of the pair of wall portions. Therefore, when an error occurs in the dimension of the first bus bar, the first bus bar may not be able to be fitted between the wall portions.

On the contrary, according to this example embodiment, since the first corner portion 111 and the second corner portion 112 are disposed in the space portion G1, the positions of the first corner portion 111 and the second corner portion 112 are allowed to be shifted. Thereby, even when the position of the first corner portion 111 and the position of the second corner portion 112 are individually shifted due to dimensional error, the first bus bar 100 can be disposed between the respective wall portions. Therefore, the effect of making it easy to arrange the first bus bar 100 between the wall portions in the present example embodiment is usefully obtained when two or more corner portions are provided in one first bus bar main body 100*a*.

Further, according to the present example embodiment, as described above, the distance between the pair of wall portions 46*a* and 46*b* and the distance between the pair of wall portions 47*a* and 47*b* increase in the upper portion. Therefore, it is easy to insert and fit each extending portion of the first bus bar main body 100*a* from above between respective wall portions. Therefore, according to the present example embodiment, the first bus bar 100 can be disposed more easily, and the assembly work efficiency of the motor 10 can be further improved.

The first bus bar main body 100*a* has intermediate portions 101*b*, 102*b*, and 103*b*. The intermediate portions 101*b*, 102*b*, and 103*b* are disposed in the space portion G2. The intermediate portion 101*b* is part of the first extending portion 101 and is a portion located between a portion supported by the support portion 45*c* of the first insulator piece 40P1 and a portion supported by the support portion 45*b* of the second insulator piece 40P2 of the first bus bar main body 100*a*.

The intermediate portion 102*b* is part of the second extending portion 102 and is a portion located between a portion supported by the support portion 45*c* of the second insulator piece 40P2 and a portion supported by the support portion 45*b* of the third insulator piece 40P3 of the first bus bar main body 100*a*.

The intermediate portion 103*b* is a part of the third extending portion 103 and is a portion located between a portion supported by the support portion 45*c* of the third insulator piece 40P3 and a portion supported by the support portion 45*b* of the fourth insulator piece 40P4 of the first bus bar main body 100*a*.

The portion of the insulator 40 is not disposed on both radial sides of the intermediate portions 101*b*, 102*b*, and 103*b*. When the insulator 40 is viewed from radially outside, the intermediate portions 101*b*, 102*b*, and 103*b* are exposed to the outside of the insulator 40. When the insulator 40 is viewed radially inside, the intermediate portions 101*b*, 102*b*, and 103*b* are exposed to the outside of the insulator 40.

The coil connection portions 121, 122, and 123 extend from the first bus bar main body 100*a*. The coil connection portion 121 is connected to the intermediate portion 101*b*. The coil connection portion 122 is connected to the intermediate portion 102*b*. The coil connection portion 123 is connected to the intermediate portion 103*b*. The coil connection portion 121 has a hook-shaped shape that protrudes radially inward from the center of the intermediate portion 101*b* in the first direction D1 and curves to the other circumferential direction side.

The coil lead 34*b* is sandwiched between the intermediate portion 101*b* and the coil connection portion 121. That is, the coil lead 34*b* is sandwiched between the first bus bar main body 100*a* and the coil connection portion 121. Although not shown, the coil connection portion 122 is crimped radially outside, and grips the coil lead 34*b* between the coil connection portion 122 and the intermediate portion 101*b*. The intermediate portion 101*b* and the coil connection portion 121 are fixed to the coil lead 34*b* by welding, for example. Thus, the coil lead 34*b* is connected to the first bus bar main body 100*a* and the coil connection portion 121. The coil connection portion 122 and the coil connection portion 123 are the same as the coil connection portion 121 except that the connecting intermediate portion is different.

According to the present example embodiment, the coil connection portions 121, 122, and 123 have a hook-shaped shape protruding radially inward from the first bus bar main body 100*a* and bent in the circumferential direction. For this reason, the coil lead 34*b* is interposed between the first bus bar main body 100*a* and the coil connection portions 121, 122, and 123 in the radial direction is hooked by each of the coil connection portions 121, 122, and 123 in the circumferential direction. Thereby, it is possible to suppress movement of the coil lead 34*b* in the circumferential direction. Therefore, it is possible to further suppress the problem that the coil leads 34*b* of the coils 34 adjacent to each other in the circumferential direction contact each other to cause a short circuit.

Also, according to the present example embodiment, the coil lead 34*b* is an end of the conducting wire constituting the coil 34 on the winding end side, and is located on the one circumferential direction side of teeth 33 when viewing along an axial direction. The coil connection portions 121, 122, and 123 protrude radially inward from a portion of the first bus bar main body 100*a* on one circumferential direction side relative to the coil lead 34*b*, and bend on the other circumferential direction side. Therefore, the coil connection portions 121, 122, and 123 can prevent the coil lead 34*b*, which is the end portion on the winding end side, from being disengaged and moving to the one circumferential direction side. Thereby, it is possible to further suppress the problem that the coil leads 34b of the coils 34 adjacent to each other in the circumferential direction contact each other to cause a short circuit.

Further, according to the present example embodiment, the intermediate portions 101b, 102b, and 103b are disposed in the space portion G2, and the coil connection portions 121, 122, and 123 are connected to the intermediate portions 101b, 102b, and 103b. For this reason, the space portion G2 can secure a space for operation in an operation of crimping the coil connection portions 121, 122, and 123, and an operation of welding the coil connection portions 121, 122, and 123 and the first bus bar main body 100a with the coil lead 34b. This facilitates each operation. Moreover, when performing the weld operation, it is possible to suppress the problem that the insulator 40 holding the first bus bar main body 100a is damaged by heat. Therefore, according to the present example embodiment, the motor 10 having a structure that facilitates connection of the coil connection portions 121, 122, and 123 and the coil lead 34b and that can suppress damage to the insulator 40 is obtained.

Further, according to the present example embodiment, the coil connection portions 121, 122, and 123 are connected to the radially inner edge portion of the first bus bar main body 100a. As a result, as described above, when the first bus bar main body 100a is held by the insulator 40 radially outside relative to the coil 34, the coil lead 34b can be easily connected to the coil connection portions 121, 122, and 123.

Further, according to the present example embodiment, the intermediate portions 101b, 102b, and 103b are intermediate portions of the extending portions bridging over the respective support portions. Therefore, the intermediate portions 101b, 102b, and 103b are disposed apart from and above the insulator 40. Thereby, it is easier to perform the crimping operation and the welding operation described above. Moreover, it is possible to further suppress the problem that the heat by welding is transmitted to the insulator 40 from the first bus bar main body 100a, and can further suppress the damage to the insulator 40.

As shown in FIG. 1, the bearing holder 50 is disposed above the stator 30. The bearing holder 50 has an annular shape centered on the center axis J. The outer peripheral face of the bearing holder 50 is fixed to the inner peripheral face of the housing 11. The bearing 52 is held on the inner peripheral face of the bearing holder 50. The bearing holder 50 has a through hole 50a that penetrates the bearing holder 50 in the axial direction. The coil lead 34a passes through the through hole 50a.

The bus bar holder 60 is disposed on the bearing holder 50. The bus bar holder 60 has a through hole 61 penetrating the bus bar holder 60 in the axial direction. The second bus bar 70 includes a second bus bar main body 71, a connection terminal 72, and a grip portion 73. The second bus bar main body 71 is embedded in the bus bar holder 60. The grip portion 73 protrudes inside the through hole 61 and grips the coil lead 34a. The connection terminal 72 is connected to the control device 80.

The control device 80 is disposed above the bus bar unit 90. The control device 80 is electrically connected to the second bus bar 70 via the connection terminal 72. As described above, the control device 80 is a power supply that supplies power to the stator 30 via the second bus bar 70. The control device 80 has a substrate and the like provided with an inverter circuit that controls the power supplied to the stator 30.

The present disclosure is not limited to the above-described example embodiments, and the following configurations can be employed. The number of first bus bars is not particularly limited as long as it is two or more. For example, neutral points of a plurality of coil groups may be connected to one first bus bar. In the example of the example embodiments described above, two first bus bars 100 may be provided, and two coil groups 35 may be connected to one first bus bar 100. The number of the first conducting wires connected to each first bus bar may be different from each other.

The first conducting wire and the second conducting wire may not extend from the radial end of the coil as long as they are located on both radial sides relative to the radial center of the coil. The first conducting wire may be located radially inside relative to the radial center of the coil, and the second conducting wire may be located radially outside relative to the radial center of the coil. In the coils adjacent to each other in the circumferential direction, each of the second conducting wires may be located on different sides in the circumferential direction with respect to the respective teeth when viewed along the axial direction. In the coils adjacent to each other in the circumferential direction, each of the second conducting wires may be located on the radially different sides relative to the radial center of each coil. The same also applies to the first conducting wire.

The number of corner portions of one first bus bar main body is not particularly limited as long as it is one or more. That is, the first bus bar main body may have only the first corner portion as a corner portion, or may have another corner portion in addition to the first corner portion and the second corner portion. The widening portion may be disposed between the wall portions of the insulator piece in which the first corner portion where the first extending portion and the second extending portion are connected is disposed. For example, in the example embodiments described above, the widening portion 101a of the first extending portion 101 may be disposed between the wall portions 46a and 46b of the second insulator piece 40P2. In this case, the first extending portion 101 is supported only by, for example, the second insulator piece 40P2. Also, in this case, the length of the first extending portion 101 is shorter than, for example, the length of the second extending portion 102. The widening portion may be provided in a portion other than the end of each extending portion. The first bus bar may not have the widening portion.

The first direction in which the first extending portion extends and the second direction in which the second extending portion extends are not particularly limited as long as they are orthogonal to the axial direction and intersect each other. The first orthogonal direction may not be orthogonal to the first direction as long as the direction is orthogonal to the axial direction and intersects the first direction. The second orthogonal direction may not be orthogonal to the second direction as long as the direction is orthogonal to the axial direction and intersects the second direction. The third orthogonal direction may not be orthogonal to the third direction as long as the direction is orthogonal to the axial direction and intersects the third direction. The first bus bar may have a plate face parallel to the axial direction. The first bus bar may be a phase bus bar. The method of manufacturing the first bus bar is not limited. The first bus bar may be manufactured by punching out the outer shape of the above-described first bus bar 100 from the plate member. The second bus bar may not be provided. In this case, the second conducting wire may be connected directly to the power supply.

The stator core may be defined by connecting a plurality of core pieces, which is members separate from one another, along the circumferential direction. In this case, each of the plurality of core pieces may have a portion of the core back and one tooth radially extending from the portion of the core back. That is, the stator core may be a split core. According to this configuration, the coils can be mounted to the respective teeth in a state in which the core pieces are separated. Therefore, mounting of the coil is easy. In particular, in the configuration in which the connecting wire is not provided as in the example embodiments described above, the core pieces on which the coil is mounted are not connected by the connecting wire. Therefore, the mounting of the coil can be made easier, and it is also easy to connect the core pieces on which the coil is mounted.

The plurality of insulator pieces of the insulator may be connected to each other. The holding member for holding the first bus bar is not particularly limited, and may not be an insulator. For example, the holding member for holding the first bus bar may be provided separately from the insulator. The number of wall portions is not particularly limited. The wall portion may not be provided. The number of support portions is not particularly limited. The support portion may not be provided. The recess may not be provided. The shape of the pressing portion is not particularly limited. The opening width of the first opening of the holding groove portion may vary in the axial direction. The lower portion of the bottom face of the holding groove portion may not be inclined. The shape of the inner edge of the holding groove portion is not particularly limited. The second conducting wire held in the holding groove portion may be an end, on the winding end side, of the conducting wire constituting the coil.

Each space portion may include its surrounding space in addition to the space between respective wall portions. Each space portion may include, for example, a space radially outside relative to the respective wall portions or a space radially inside relative to the respective wall portions. That is, for example, the corner portion disposed in each space portion may be provided so as to protrude radially outside relative to the pair of wall portions, or be provided radially inside relative to the pair of wall portions. Each intermediate portion disposed in each space portion may be provided so as to protrude radially outside relative to the pair of wall portions, or may be provided radially inside relative to the pair of wall portions.

The motor may not be a three-phase motor. The motor may be an N-phase motor, where N is any integer of 2 or more. In this case, N first conducting wires may be connected to each first bus bar.

In addition, the application of the motor of the example embodiments described above is not specifically limited. Moreover, respective structures mentioned above can be combined suitably in the range in which they do not contradict each other.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor including a shaft disposed along a center axis;
a stator facing the rotor via a clearance in a radial direction; and
a plurality of first bus bars electrically connected to the stator on one axial direction side of the stator; wherein
the stator includes:
a stator core including a circumferentially extending core back and a plurality of teeth radially extending from the core back; and
a plurality of coils defined by a wound conducting wire and each of which is mounted on the plurality of teeth; wherein
a first conducting wire and a second conducting wire, which are both respective ends of the conducting wire, extend to one axial direction side from each of the plurality of coils;
the plurality of first bus bars is neutral point bus bars connecting two or more of the first conducting wires as neutral points;
the second conducting wire is connected to a power supply that supplies power to the stator;
in each of the coils, the first conducting wire and the second conducting wire are located on two respective sides of the teeth in a circumferential direction when viewed along an axial direction;
the first conducting wire is located on one radial direction side relative to a radial center of each coil;
the second conducting wire is located on the other radial direction side relative to the radial center of the coil,
the first bus bar includes:
a first bus bar main body extending in the circumferential direction; and
a hook-shaped coil connector that protrudes from the first bus bar main body to another radial direction side and that bends in the circumferential direction:
the first con wire is sandwiched between the first bus bar main body rind the coil connector in the radial direction; and
the first conducting wire is connected to the first bus bar main body and the coil connector.

2. The motor according to claim 1, wherein
the first conducting wire extends from a first end of the coil on one radial direction side; and
the second conducting wire extends from a second end of the coil on another radial direction side.

3. The motor according to claim 1, wherein when viewed along the axial direction, the respective second conducting wires are located on the same side in the circumferential direction with respect to each of the teeth and are located on the same side in the radial direction relative to the radial center of each coil.

4. The motor according to claim 1, wherein
the motor is an N-phase motor, where N is any integer of 2 or more; and
N ones of the first conducting wires are connected to each of the plurality of first bus bars.

5. The motor according to claim 1, wherein
the first conducting wire is an end of the conducting wire on a winding end side, and is located on one circumferential direction side of the teeth when viewed along the axial direction; and
the coil connector protrudes to another radial direction side from a portion of the first bus bar main body on one circumferential direction side relative to the first conducting wire, and bends to the other circumferential direction side.

6. The motor according to claim 1, further comprising:
a second bus bar to which the second conducting wire is connected; wherein the second conducting wire is connected to the power supply via the second bus bar.

7. The motor according to claim 1, wherein
the stator core includes a plurality of core pieces which are separate members connected with each other along a circumferential direction; wherein
each of the plurality of core pieces includes a portion of the core back and one of the teeth radially extending from the portion of the core back.

8. A motor comprising:
a rotor including a shaft disposed along a center axis;
a stator facing the rotor via a clearance in a radial direction; and
a plurality of first bus bars electrically connected to the stator on one axial direction side of the stator; wherein
the stator includes:
   a stator core including a circumferentially extending core back and a plurality of teeth radially extending from the core back; and
   a plurality of coils defined by a wound conducting wire and each of which is mounted on the plurality of teeth; herein
first conducting wire and a second conducting wire, which are both respective ends of the conducting wire, extend to one axial direction side from each of the plurality of coils;
the plurality of first bus bars is neutral point bus bars connecting two or more of the first conducting wires as neutral points;
the second conducting wire is connected to a power supply that supplies power to the stator;
in each of the coils, the first conducting wire and the second conducting wire are located on two respective sides of the teeth in a circumferential direction when viewed along an axial direction;
the first conducting wire is located on one radial direction side relative to a radial center of each coil;
the second conducting wire is located on the other radial direction side relative to the radial center of the coil;
the stator includes an insulator mounted to the stator core;
each of the plurality of coils is mounted to the plurality of teeth via the insulator;
the insulator includes:
   a cylindrical tube through which the teeth pass and on which the coil is mounted; and
   a conducting wire holder connected to an end of the tube on the other radial direction side and protruding to one axial direction side relative to the tube;
the conducting wire holder includes a holding groove recessed from a face of the conducting wire holder on one radial direction side to the other radial direction side and extending in the axial direction; and
the second conducting wire is held in the holding groove.

9. The motor according to claim 8, wherein
the first conducting wire extends from a first end of the coil on one radial direction side; and
the second conducting wire extends from a second end of the coil on another radial direction side.

10. The motor according to claim 8, wherein when viewed along the axial direction, the respective second conducting wires are located on the same side in the circumferential direction with respect to each of the teeth and are located on the same side in the radial direction relative to the radial center of each coil.

11. The motor according to claim 8, wherein
the motor is an N-phase motor, where N is any integer of 2 or more; and
N ones of the first conducting wires are connected to each of the plurality of first bus bars.

12. The motor according to claim 8, further comprising:
a second bus bar to which the second conducting wire is connected; wherein
the second conducting wire is connected to the power supply via the second bus bar.

13. The motor according to claim 8, wherein
the stator core includes a plurality of core pieces which are separate members connected with each other along a circumferential direction; wherein
each of the plurality of core pieces includes a portion of the core back and one of the teeth radially extending from the portion of the core back.

* * * * *